United States Patent
Martone et al.

(10) Patent No.: US 9,057,783 B2
(45) Date of Patent: Jun. 16, 2015

(54) CHANGE DETECTION METHOD AND SYSTEM FOR USE IN DETECTING MOVING TARGETS BEHIND WALLS, BARRIERS OR OTHERWISE VISUALLY OBSCURED

(75) Inventors: Anthony F. Martone, Ellicott City, MD (US); Kenneth I. Ranney, Rockville, MD (US); Calvin Duc Le, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 859 days.

(21) Appl. No.: 13/233,434

(22) Filed: Sep. 15, 2011

(65) Prior Publication Data

US 2012/0182171 A1     Jul. 19, 2012

Related U.S. Application Data

(63) Continuation-in-part of application No. 13/008,549, filed on Jan. 18, 2011, now Pat. No. 8,502,731.

(51) Int. Cl.
*G01S 13/00* (2006.01)
*G01S 13/88* (2006.01)
*G01S 13/56* (2006.01)

(52) U.S. Cl.
CPC .............. *G01S 13/888* (2013.01); *G01S 13/56* (2013.01)

(58) Field of Classification Search
CPC ....................................................... G01S 13/56
USPC ................................................... 342/22, 191
See application file for complete search history.

(56) References Cited

U.S. PATENT DOCUMENTS 8,670,619 B2 *   3/2014   Funayama et al. ............ 382/190

OTHER PUBLICATIONS

A. Martone, K. Ranney, R. Innocenti, "Automatic Through the Wall Detection of Moving Targets using Low-Frequency Ultra-Wideband Radar," Proceedings of the IEEE international radar conference, Washington, DC, May 2010.
A. Martone, K. Ranney, R. Innocenti, "An Analysis of Clustering Tools for Moving Target Indication," ARL-TN-5037; U.S. Army Research Laboratory: Adelphi, MD, Nov. 2009.
A. Martone, K. Ranney, R. Innocenti, "Through the wall detection of slow moving personnel," Proceedings of the SPIE conference on Radar Sensor Technology XIII, vol. 7308, Orlando, FI, Apr. 2009.

(Continued)

*Primary Examiner* — Timothy A Brainard
(74) *Attorney, Agent, or Firm* — Lawrence E. Anderson

(57) ABSTRACT

A system and method for locating a moving target behind a wall or barrier comprising: providing a plurality of images of the region of interest; selecting a reference image from the plurality of images; forming a predetermined number of difference images by subtracting the absolute value of the pixels of the reference image from the absolute values of pixels in a predetermined number of the plurality of images; eliminating negative pixel values in the predetermined number of difference images; minimizing the side lobes to form a combined difference image for each reference frame, selecting another reference image from the plurality of images and performing the steps of forming a plurality of difference images, eliminating negative pixel values, averaging the resulting predetermined number of difference images and minimizing the side lobes for each selected reference image to form a set of combined difference images which contain the moving target signature.

20 Claims, 24 Drawing Sheets
(20 of 24 Drawing Sheet(s) Filed in Color)

CHANGE DETECTION TECHNIQUE BASED ON NON-COHERENT
CHANGE DETECTION FOR A GIVEN REFERENCE IMAGE

(56) References Cited

OTHER PUBLICATIONS

A. Martone, K. Ranney, R. Innocenti, "Moving Target Indication for Transparent Urban Structures," ARL-TN-4809; U.S. Army Research Laboratory: Adelphi, MD, May 2009.

A. Martone, K. Ranney, R. Innocenti, "Clustering analysis of moving target signatures," Proceedings of the SPIE conference on Radar Sensor Technology XIV, Orlando, Fl, Apr. 2010.

A. Jain, "Fundamentals of Digital Image Processing," Prentice-Hall International, Englewood Cliffs, NJ, pp. 384-387 (1989).

Ressler, M.; et al., "The Army Research Laboratory (ARL) Synchronous Impulse Reconstruction (SIRE) Forward-Looking Radar," Proceedings of the SPIE Conference on Unmanned Systems Technology IX, vol. 6561, Bellingham, WA, Apr. 2007, 656105-1-656105-12.

McCorkle, J. "Focusing of Synthetic Aperture Ultra Wideband Data," Proceedings of the IEEE International Conference on Systems Engineering, Dayton, OH, Aug. 1991, 1-5.

Novak, L. "Change Detection for Multi-polarization, Multi-pass SAR," Proceedings of the SPIE Conference on Algorithms for Synthetic Aperture Radar Imagery XII, vol. 5808, Orlando, Fl, Mar. 2005, 234-246.

Gandhi, P. P., et al., "Analysis of CFAR Processors in Homogeneous Background" IEEE Transactions on Aerospace and Electronic Systems Jul. 1988, 24 (4), 427-445.

Wilpon, J., et al., "A Modified K-means Clustering Algorithm for Use in Isolated Work Recognition," IEEE Transactions on Acoustics, Speech and Signal Processing vol. 33, No. 3, Jul. 1985, 587-594.

Duta, R.; Hart, P.; Stork, D. "Pattern Classification," 2nd ed. John Wiley and Sons Inc.: New York, NY, pp. 542-548 (2001).

Thorndike, R. "Who belongs in the family?" Psychometrika Dec. 1953, 18 (4), 267-276.

Zhao, Q.; Xu, M.; Franti, P. "Knee Point Detection on Bayesian Information Criteria," Proceedings of the 20th IEEE International Conference on Tools with Artificial Intelligence, vol. 2, Nov. 2008, 431-438.

Nguyen, Lam, "SAR Imaging Technique for Reduction of Sidelobes and Noise," Proceedings of SPIE, vol. 7308 (2009).

Dogaru, T., et al., "Computer Models of the Human Body Signature for Sensing Through the Wall Radar Applications," ARL TR-4290, U.S. Army Research Laboratory, Adelphi, MD.

\* cited by examiner

FIG. 1 Synchronous Impulse Reconstruction (SIRE) Radar

FIG. 2  Moving target indication system for data collected by a low-frequency, UWB radar.

Moving target indication system for data collected by a low-frequency, UWB radar.

CHANGE DETECTION TECHNIQUE BASED ON NON-COHERENT CHANGE DETECTION FOR A GIVEN REFERENCE IMAGE

CAD model of the building structure. Moving target positions are simulated.

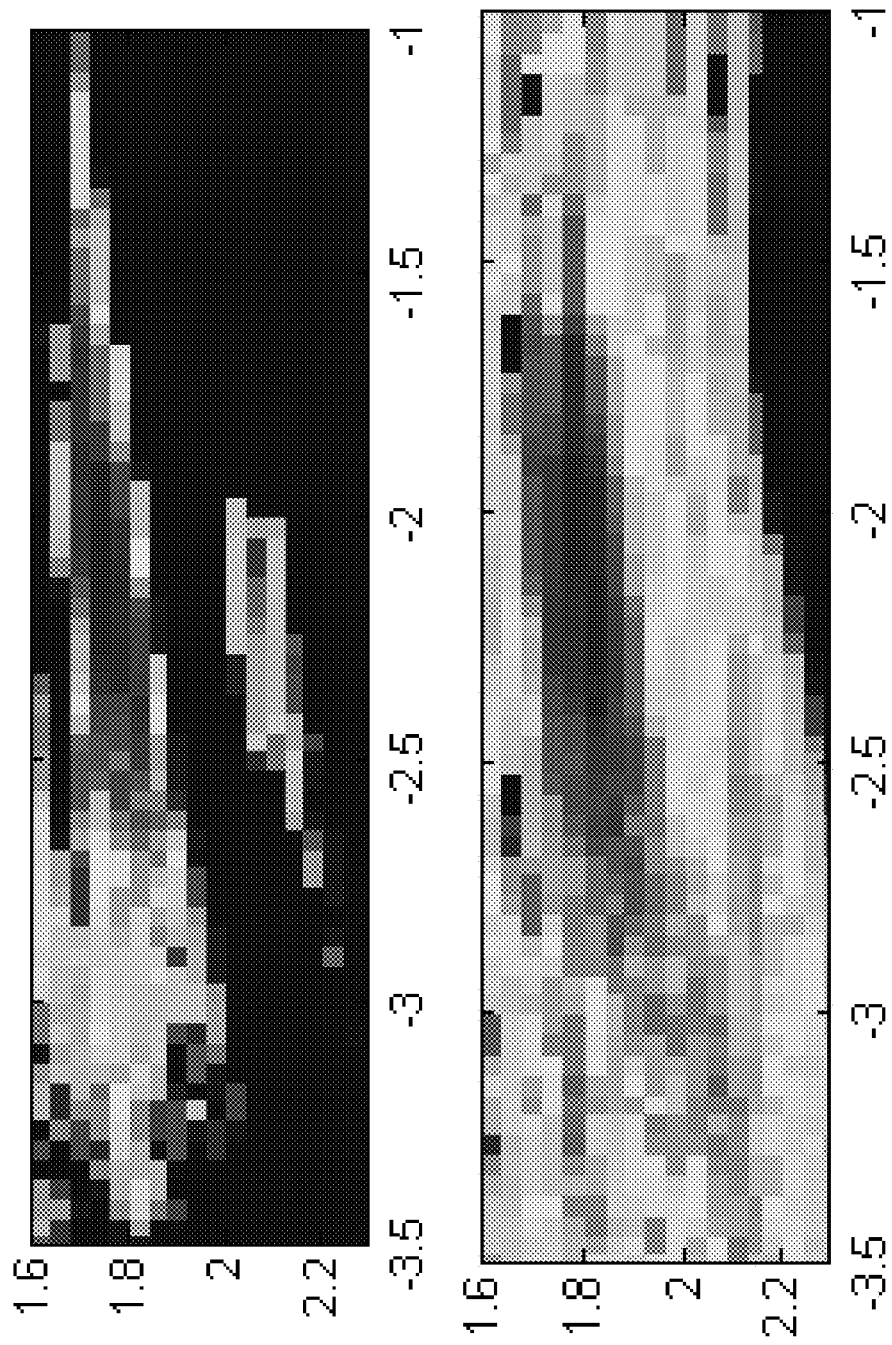
FIG. 8 MT signatures of change detection images in Figures 7A and 7B. Images are of size 0.7x2.5m with a 30dB dynamic range.

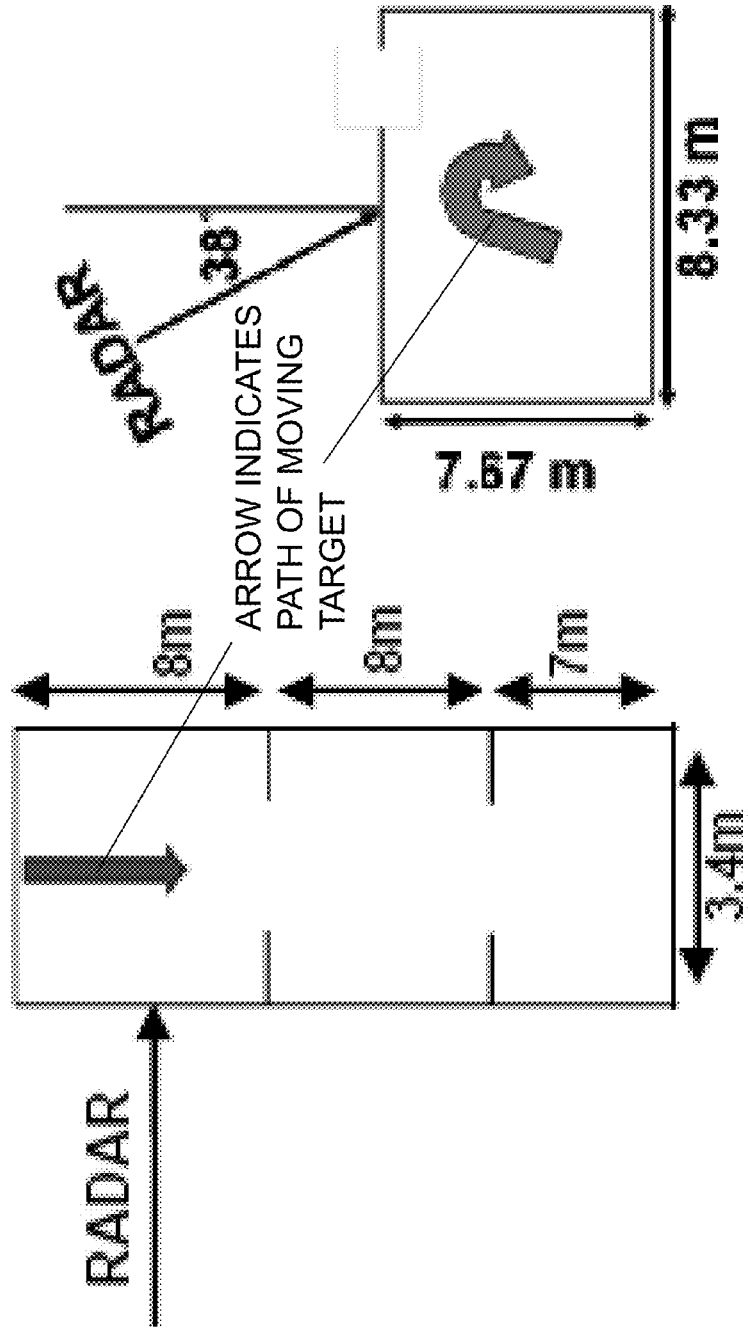
FIG. 9 BUILDING LAYOUTS FOR MTI EXPERIMENTS.

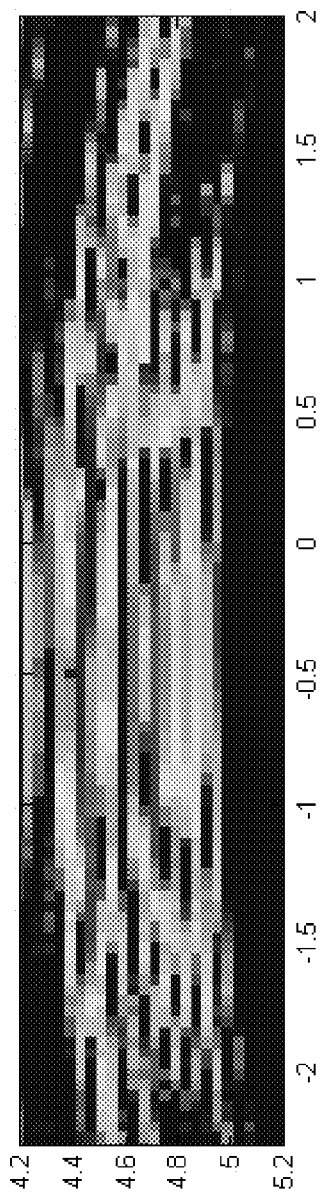
FIG. 11A MT signature of CCD image of FIG. 10A.
Image is of size 1.0x4.3m with a 20dB dynamic range.
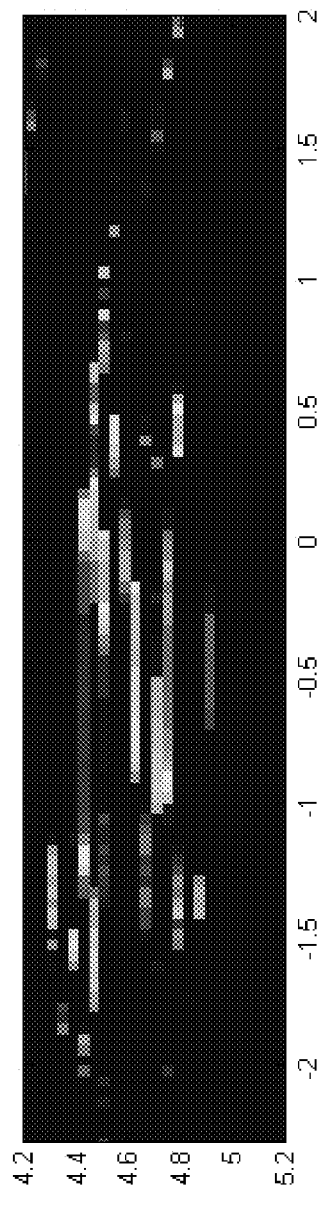
FIG. 11B MT signature of MNCD image of FIG. 10B.
Image is of size 1.0x4.3m with a 20dB dynamic range.

CCD IMAGE No. 33

MNCD IMAGE No. 33

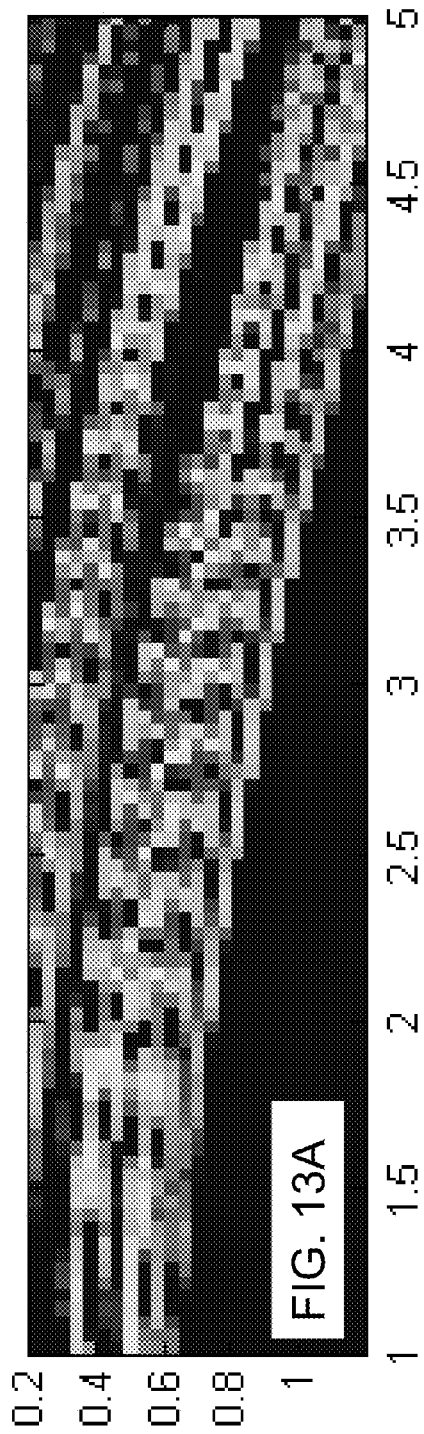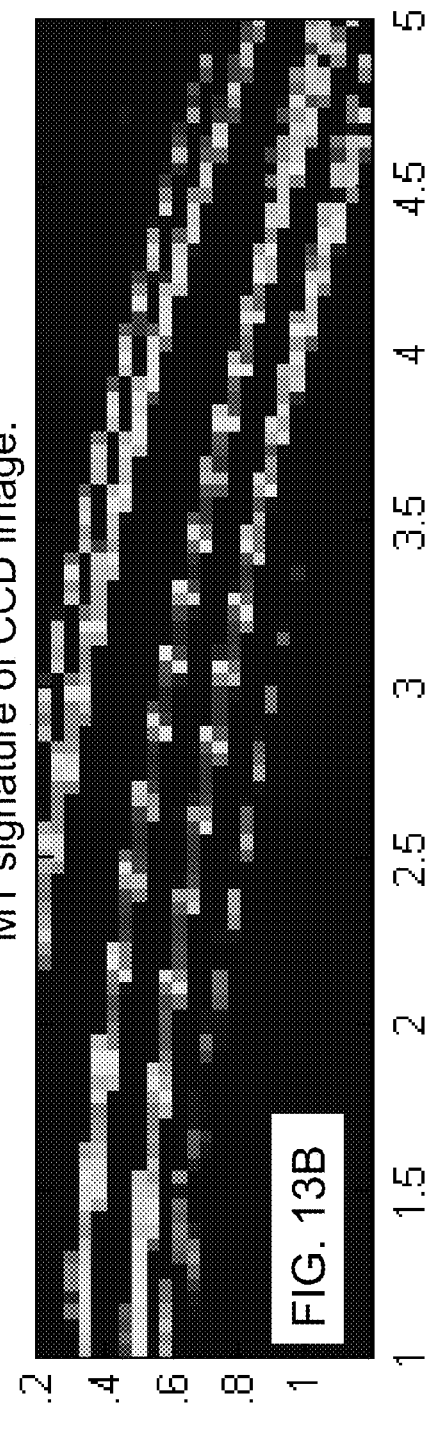
Figure 13 MT signatures of change detection images in Figures 12A and 12B. Images are of size 1x4m with a 20dB dynamic range.

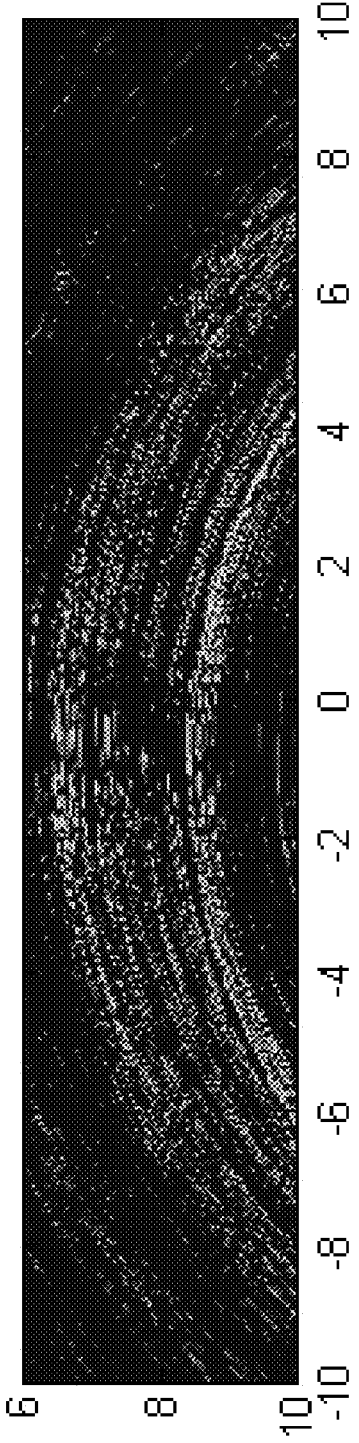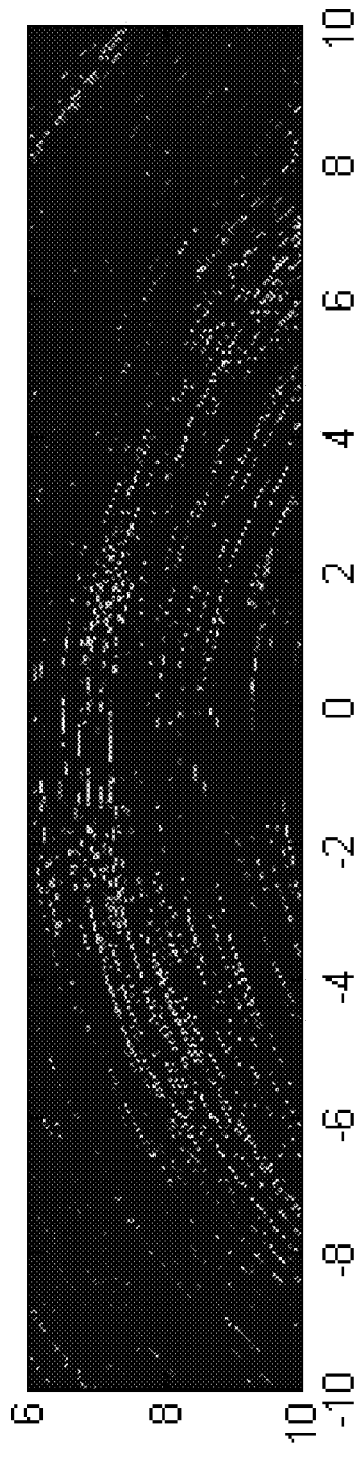
FIG. 14A
FIG. 14B
Cinderblock front-wall imaging artifacts of CCD and MNCD images. Images are of size 4x20m with a 20dB dynamic range.

Change detection images of measured data of a cinderblock building. Each image is normalized and uses a dynamic range of 20dB.

Example CFAR window, comprising an inner, guard, and outer window.

Example of a CFAR window placed over the MT signature, where the inner window is overlaid on the MT signature and the outer window covers the background of the local area. The inner window contains pixels with higher energy compared with the pixels in the outer window.

(18A) The morphological image that contains POIs. When these images are input into a clustering algorithm, two clusters are identified; the clusters and corresponding centroids are shown in (18B).

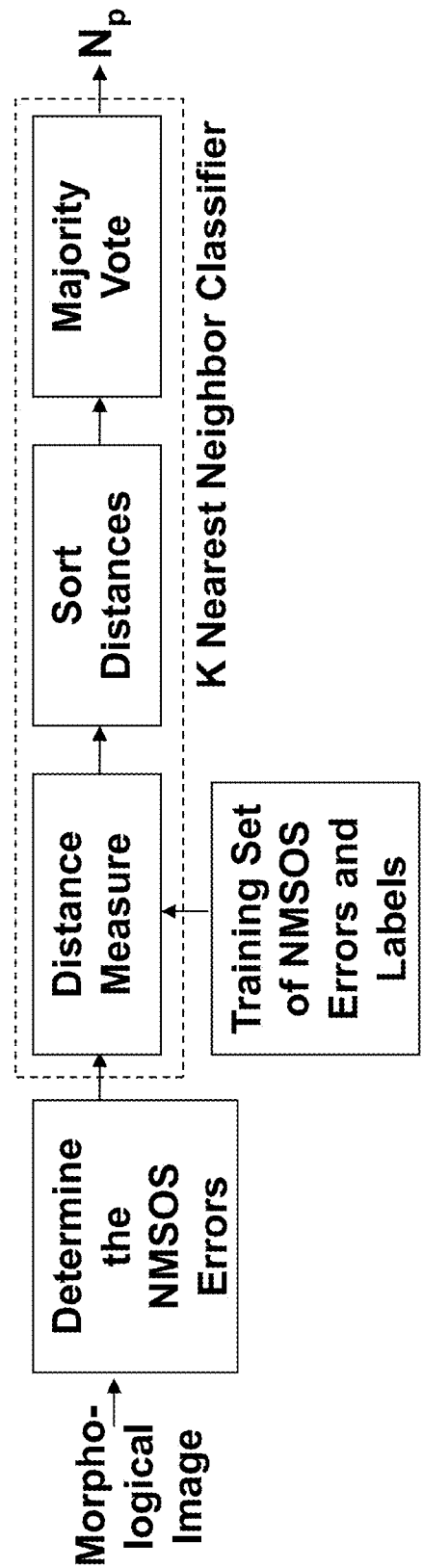
FIG. 19 Block diagram of the adaptive KP algorithm.

CHANGE DETECTION METHOD AND SYSTEM FOR USE IN DETECTING MOVING TARGETS BEHIND WALLS, BARRIERS OR OTHERWISE VISUALLY OBSCURED

CROSS REFERENCE TO RELATED APPLICATIONS

This application is a continuation-in-part and claims priority to U.S. application Ser. No. 13/008,549 entitled "System and Method for Moving Target Detection," filed Jan. 18, 2011, hereby incorporated by reference.

STATEMENT OF GOVERNMENT INTEREST

The embodiments herein may be manufactured, used, and/or licensed by or for the United States Government without the payment of royalties thereon.

BACKGROUND OF THE INVENTION

Security and military forces operating in urban environments need the capability to detect slow moving personnel inside buildings. To identify moving personnel inside buildings, a time-domain approach may be used that uses a low-frequency, ultra-wideband (UWB) radar. A low-frequency, UWB radar is desired since the low-frequency UWB radar transmits pulses capable of penetrating through walls and the UWB corresponds to a high range resolution that gives the capability to better locate the moving target (MT). The publication entitled "Through the Wall Detection of Slow Moving Personnel," by Martone, A.; et al., in the Proceedings of the SPIE Conference on Radar Sensor Technology XIII, vol. 7308, Orlando, Fla., April 2009, hereby incorporated by reference, discloses a description of a moving target indication (MTI) processing approach to detect and track slow-moving targets inside buildings, which successfully detected moving targets (MTs) from data collected by a low-frequency, ultra-wideband radar. Synchronous Impulse Reconstruction (SIRE) Radar is a low-frequency, ultra-wideband (UWB) radar having a frequency range of 300 MHz-3 GHz. An example of a SIRE system is illustrated in FIG. 1, showing 2 transmitters and 16 receivers in an antenna array 2 m wide having an average power of 5 mW with a downrange swath is 10-35 meters and a downrange resolution is 0.056 meters. Moving Target Indication (MTI) processing algorithms include change detection (CD), used to identify the MT signature; automatic target detection (ATD), used to eliminate imaging artifacts and potential false alarms due to target multi-bounce effects; clustering, used to identify a centroid for each cluster in the ATD output images; and tracking, used to establish a trajectory of the moving target (MT). These algorithms can be implemented in a real-time or near-real-time system.

In research reported in Martone, A. et al., "Moving Target Indication for Transparent Urban Structures," ARL-TN-4809, U.S. Army Research Laboratory: Adelphi, Md., May 2009, both of which are hereby incorporated by reference, the effectiveness of time-domain, moving target indication (MTI) approach was reported for detecting moving personnel inside wood and cinderblock structures, moving personnel walking in nonlinear trajectories, and multiple moving personnel walking in linear trajectories. In the research, a time-domain approach to MTI was considered as an alternative to a frequency-domain approach, i.e., Doppler processing, since a very small Doppler shift in backscattered frequency is generated due to (1) the slow motion of the mover and (2) the low frequency needed to penetrate through the wall. The reported time-domain processing algorithms are based on the change detection (CD) paradigm, which is inherently similar to clutter cancellation. In the CD paradigm, the Synchronous Impulse Reconstructive (SIRE) radar remains stationary and generates a set of images for a region of interest (ROI). Each image in the set is formed every two-thirds of a second. The stationary objects in the building remain in the same location in each image; however, moving personnel will be at different locations. The moving personnel can be detected by subtracting adjacent images in the set, thereby eliminating the stationary objects and identifying the MT signature. Additional processing is utilized to enhance the MT signature, including a constant false alarm rate (CFAR) algorithm, morphological processing, k-Means clustering, and a tracking algorithm. CFAR and morphological processing are approaches used to eliminate imaging artifacts and potential false alarms due to target multi-bounce effects. The k-Means clustering algorithm is used to identify centroids for given input clusters, where the clusters are produced by the CFAR and morphological processing algorithms. Based upon input of the centroids, the tracker is used to establish a trajectory of the moving target (MT). Notwithstanding the above reported efforts, there exists a need for further refinement and improved accuracy of the moving target tracking system.

SUMMARY OF THE INVENTION

The present invention includes an enhanced change detection technique for detecting and/or tracking moving targets inside buildings or behind walls, barriers, or the like. The present invention is adapted to detect signatures associated with moving targets, significantly attenuates imaging artifacts thereby reducing the number of false alarms, and has been successfully demonstrated detection capabilities of personnel walking inside wood and cinderblock buildings. The present invention comprises a change detection algorithm used in conjunction with a fully automated moving target indication (MTI) system. The MTI system can be used to detect and track hostile personnel, snipers or hostages inside, inter alia, wood and cinderblock buildings. The MTI system can be used to track personnel inside buildings in a range from 8 meters to 33 meters inside building structures.

A preferred embodiment of the present invention comprises a system capable of determining the presence of a moving target behind a wall or barrier based upon a time progression radar images of a region of interest, the system comprising at least one processor and at least one memory operatively connected; the at least one memory adapted to store a plurality of radar images of the region of interest that may contain a moving target signature taken at different points in time; the at least one processor operating to sequentially designate one of the plurality of radar images as a reference frame, subtract the absolute pixel values of the reference image from the absolute pixel values of a predetermined number of radar images to form difference images, eliminate the negative pixel values to form a set of "positive" difference images, and, minimize the side lobes to form a combined difference image for each reference frame, whereby the system forms a series of combined difference images which contain the moving target signature.

Optionally, following the elimination of the negative pixel values; the system may sequentially average the resulting difference images for each reference frame prior to minimizing the side lobes.

The series of combined difference images formed by the preferred embodiment change detection technique may be further processed by utilizing constant false alarm reduction (CFAR), morphological processing, cluster prediction, clustering and tracking as described further in U.S. application Ser. No. 13/008,549, hereby incorporated by reference.

Optionally, the processor may form the difference images by selecting a reference image and selecting a first image taken prior in time to the reference image and a second image taken after the reference image. First and second difference images may then be formed by subtracting the reference image (absolute pixel values) from each of the absolute pixel values of the first and second images to form first and second difference images, respectively.

Optionally, when the moving target is located between a front wall or barrier and a back wall or barrier, and when the front wall and back wall or barrier produce radar signatures on the images of the region of interest, such signatures are effectively subtracted out or eliminated from the difference images during the subtraction process.

A preferred method comprises providing a plurality of images of the region of interest that may contain a moving target signature taken at different points in time; selecting a reference image from the plurality of images; forming a predetermined number of difference images of the region of interest by subtracting the absolute value of the pixels of the reference image from the absolute values of pixels in a predetermined number of the plurality of images; eliminating the negative pixel values in the predetermined number of difference images; minimizing the side lobes to form a combined difference image for each reference frame, selecting another reference image from the plurality of images and performing the steps of forming a plurality of difference images, eliminating the negative pixel values, averaging the resulting predetermined number of difference images and minimizing the side lobes for each selected reference image to form a set of combined difference images which contain the moving target signature.

Optionally, following the elimination of the negative pixel values; the preferred method may include sequentially averaging the resulting difference images for each reference frame prior to minimizing the side lobes.

Optionally, the preferred method may include forming the difference images using images taken immediately before and after the difference images.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In FIGS. 5A, 5B, 7A-F, 8, 10A-D, 11A, 11B, 12A-D, 13A, 13B, 14A, 14B, 15A and 15B the colors represent a decibel range which ranges from red to blue, red being the strongest signal and blue being the weakest.

Figure 1:
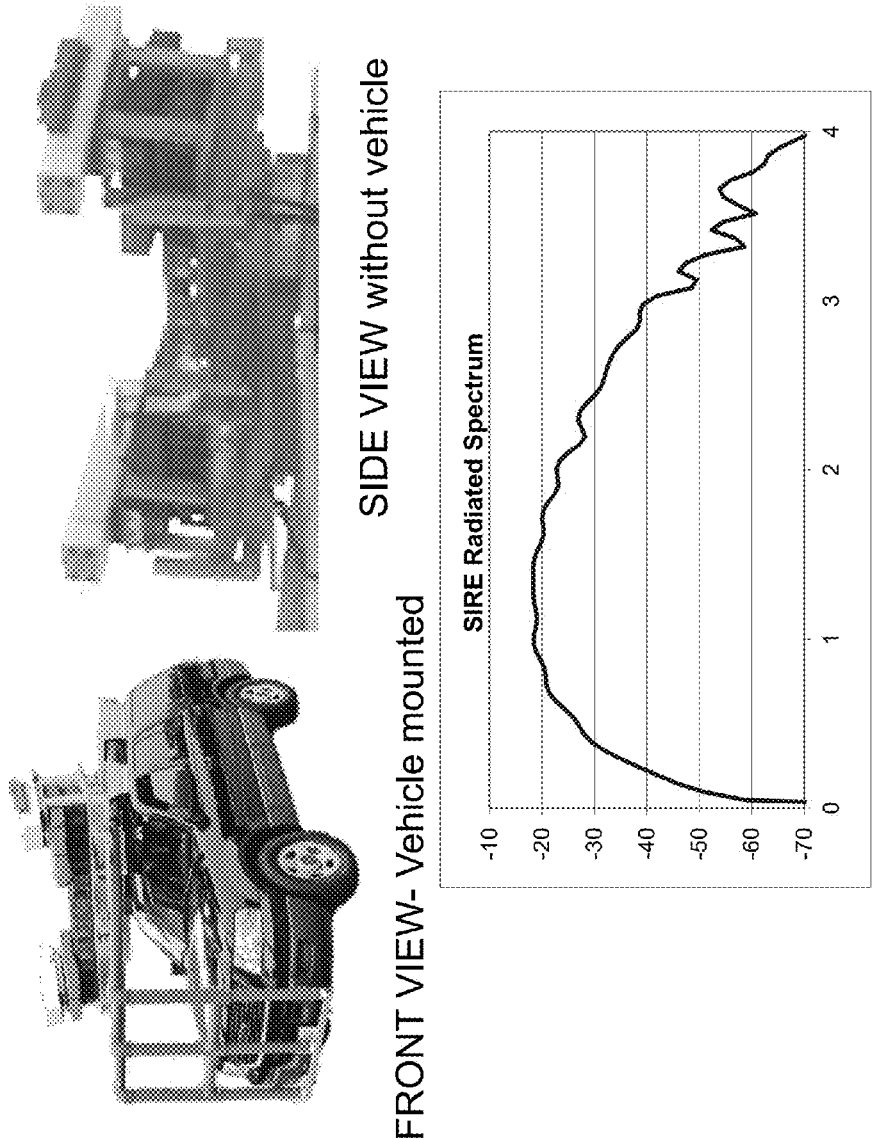

The embodiments herein will be better understood from the following detailed description with reference to the drawings, in which:

FIG. 1 illustrates a schematic diagram of a vehicle having synchronous Impulse Reconstruction (SIRE) Radar mounted thereon.

Figure 2:
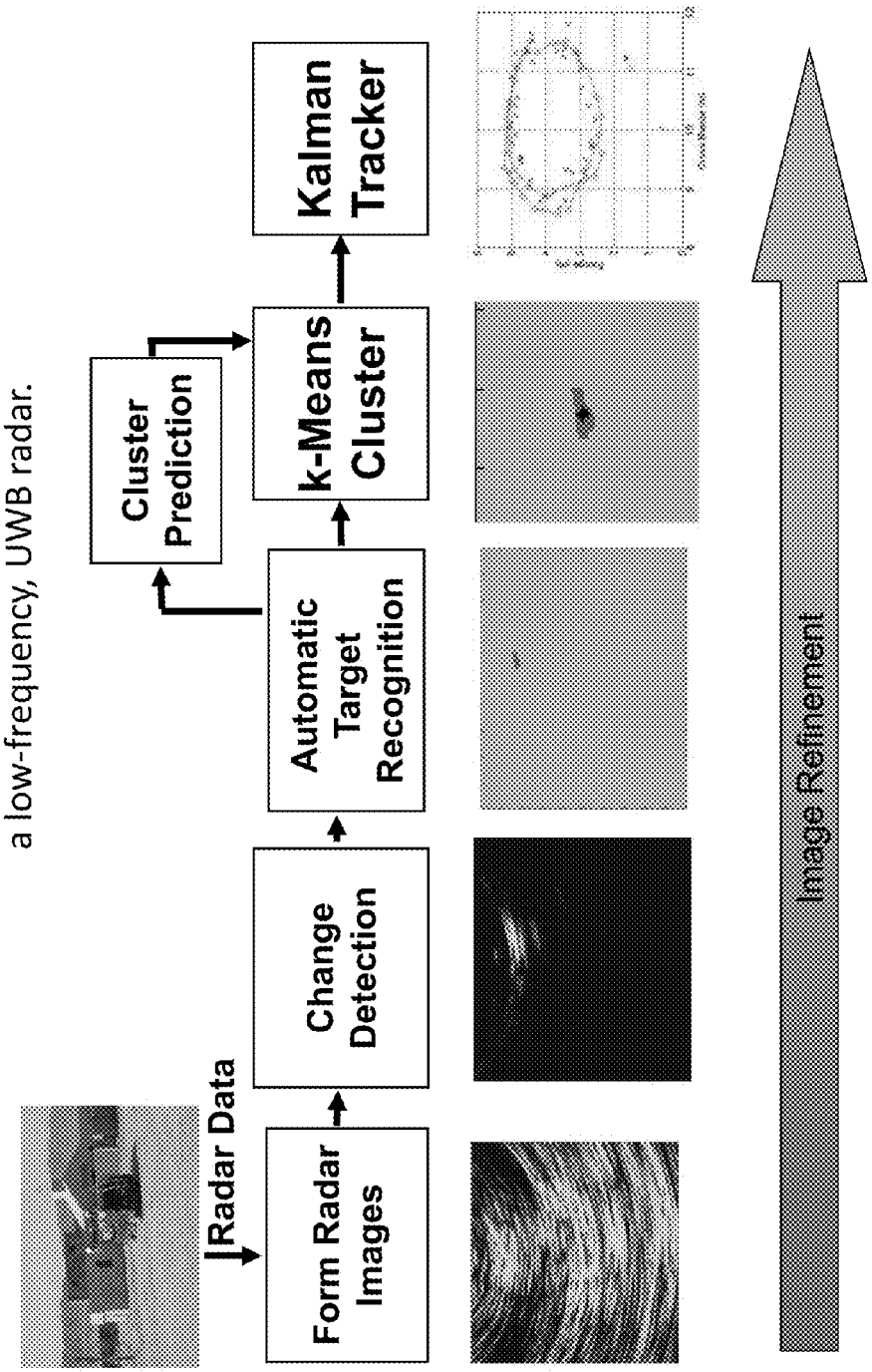

FIG. 2 is a block diagram showing a moving target indication system for data collected by a low-frequency UWB radar with correlated illustrations.

Figure 3:
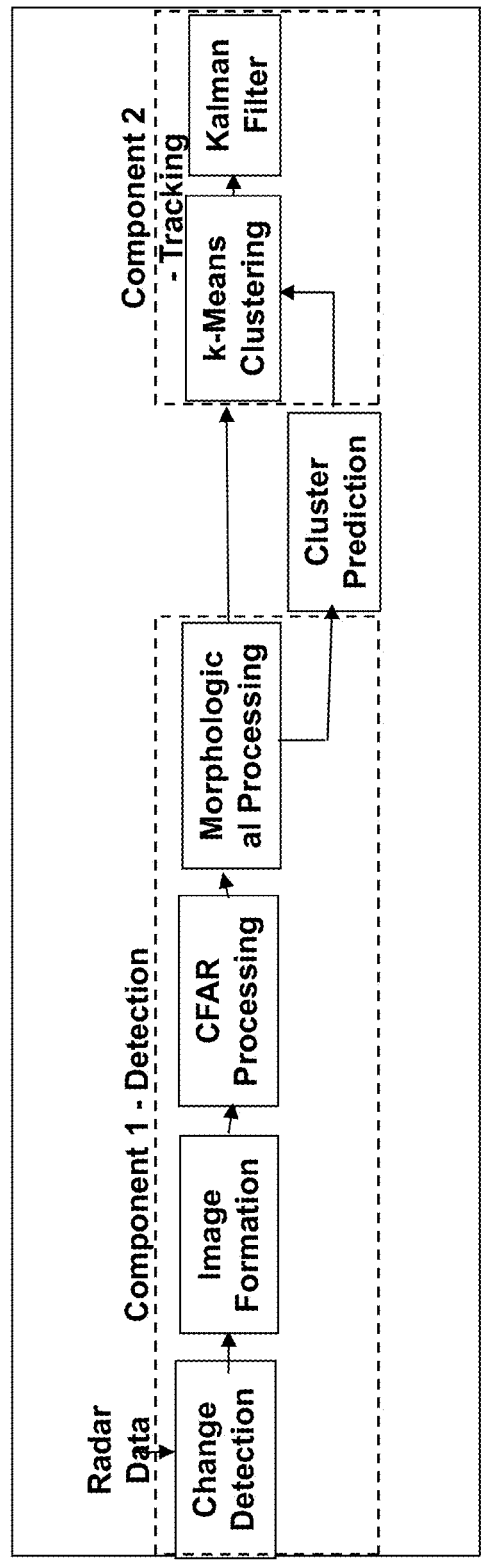

FIG. 3 is a block diagram of a is a block diagram showing a moving target indication system for data collected by a low-frequency UWB radar including CFAR Processing and Morphological Processing.

Figure 4:
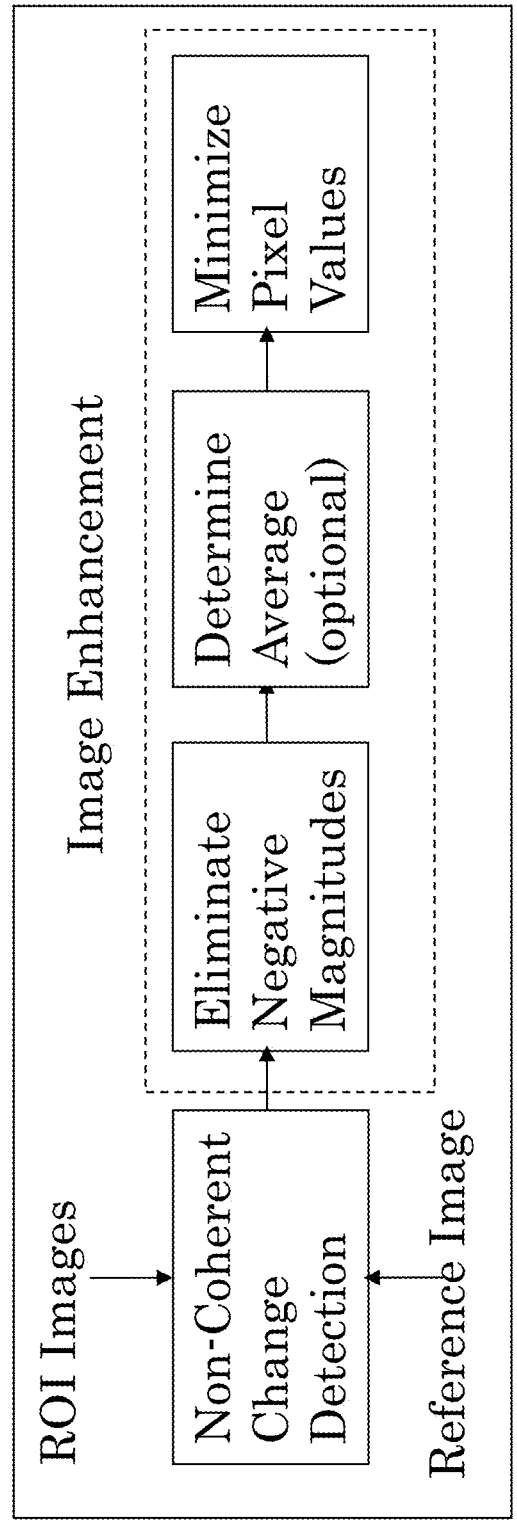

FIG. 4 is a block diagram illustrating a change detection technique based on non-coherent change detection for a given reference image.

Figure 5A:
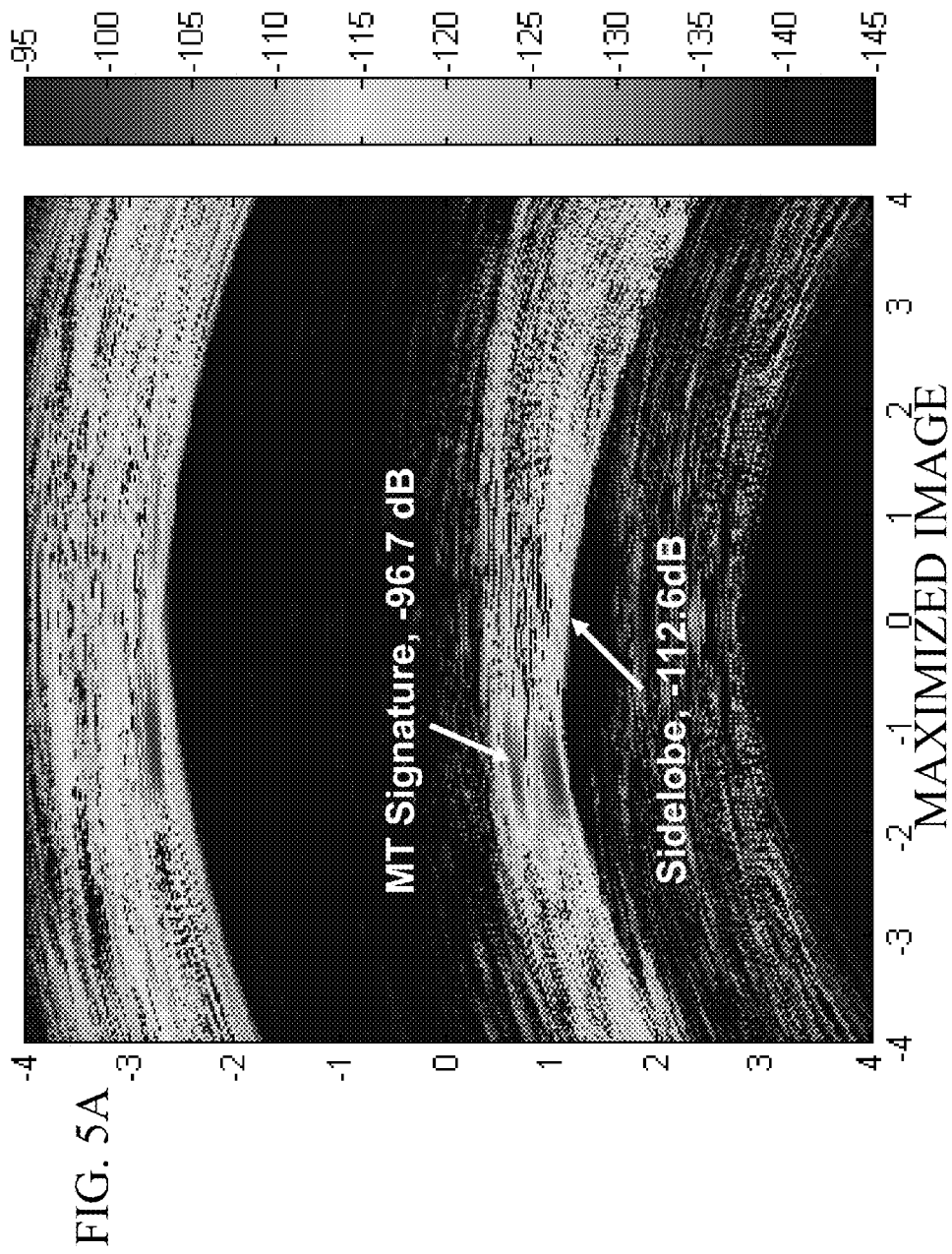

FIG. 5A is an image generated using a maximization procedure.

Figure 5B:
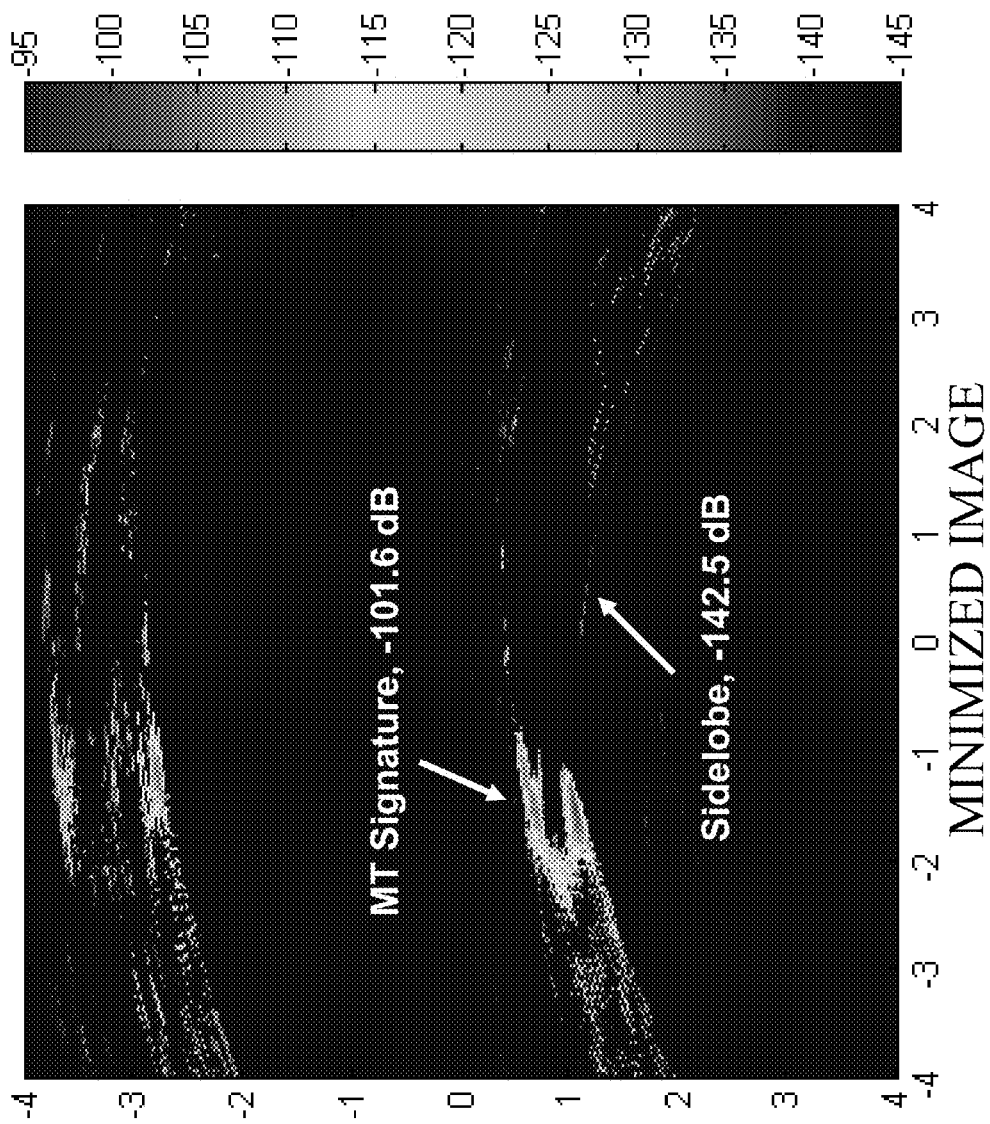

FIG. 5B is an image generated using a minimization procedure. A significant difference in sidelobe energy is observed between the images of FIGS. 5A and 5B.

Figure 6:
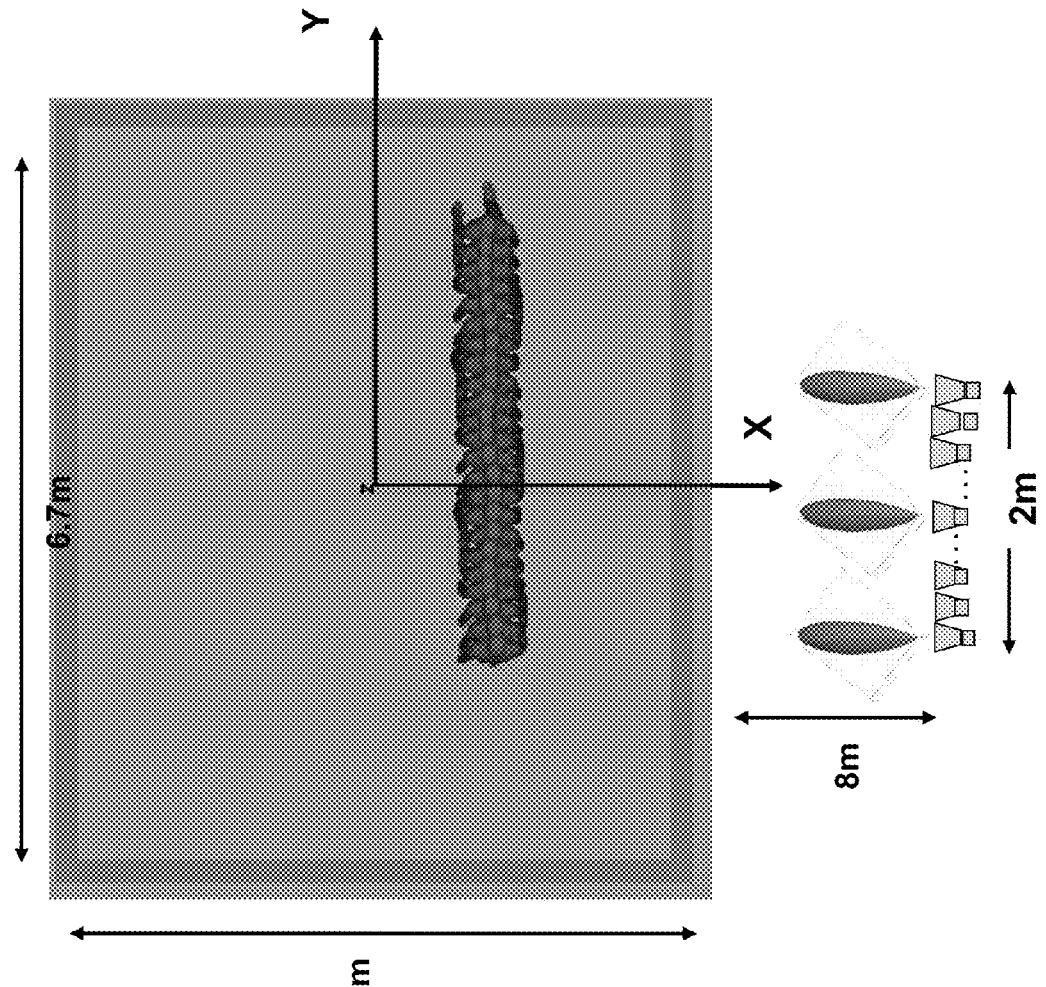

FIG. 6 schematically illustrates a CAD model of the building structure with simulated moving target positions.

FIGS. 7A-7F illustrate change detection images of modeled data. Each image is normalized and uses a dynamic range of 30 dB. "Image Number" refers to the position of the image in the sequence of all change detection images.

Figures 7A, 7B:
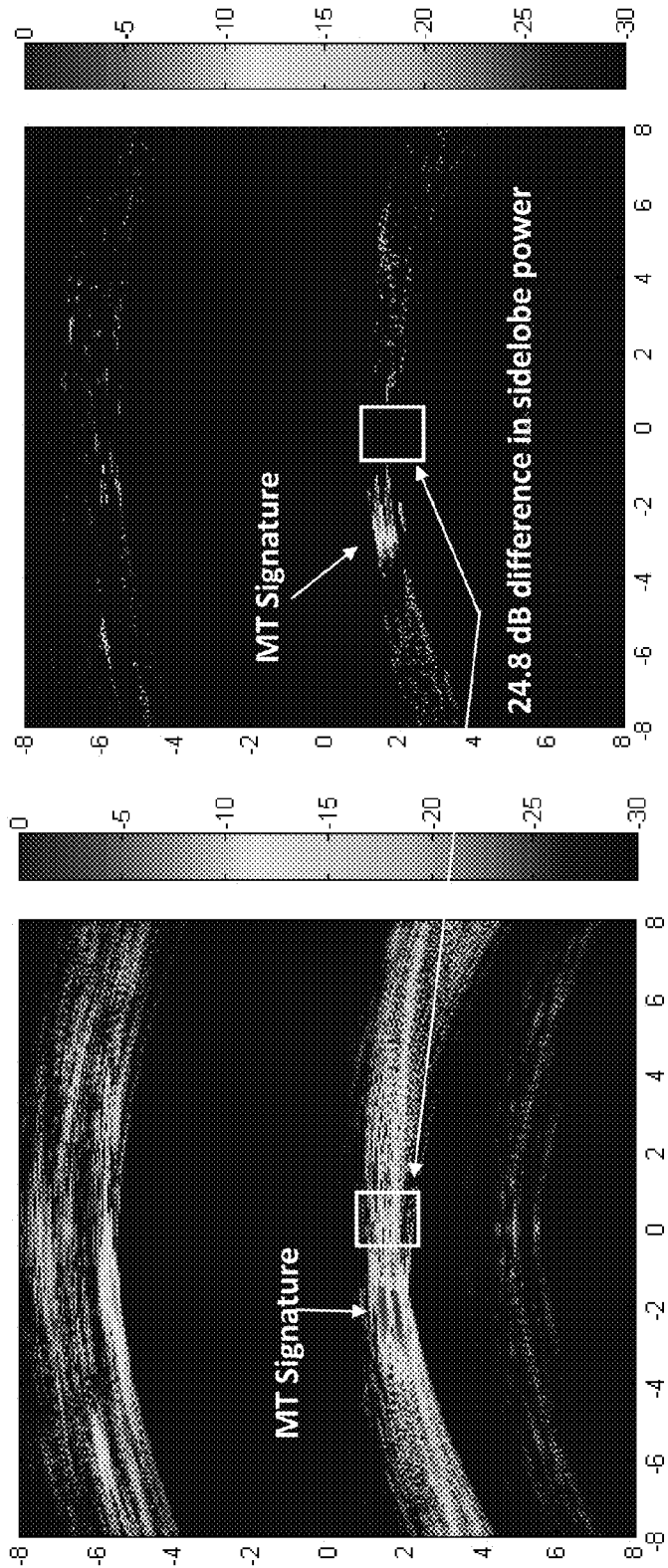

FIG. 7A illustrates CCD (Coherent Change Detection) Image No. 3.

FIG. 7B illustrates MNCD (MTI NonCoherent Change Detection) Image No. 3.

Figures 7C, 7D:
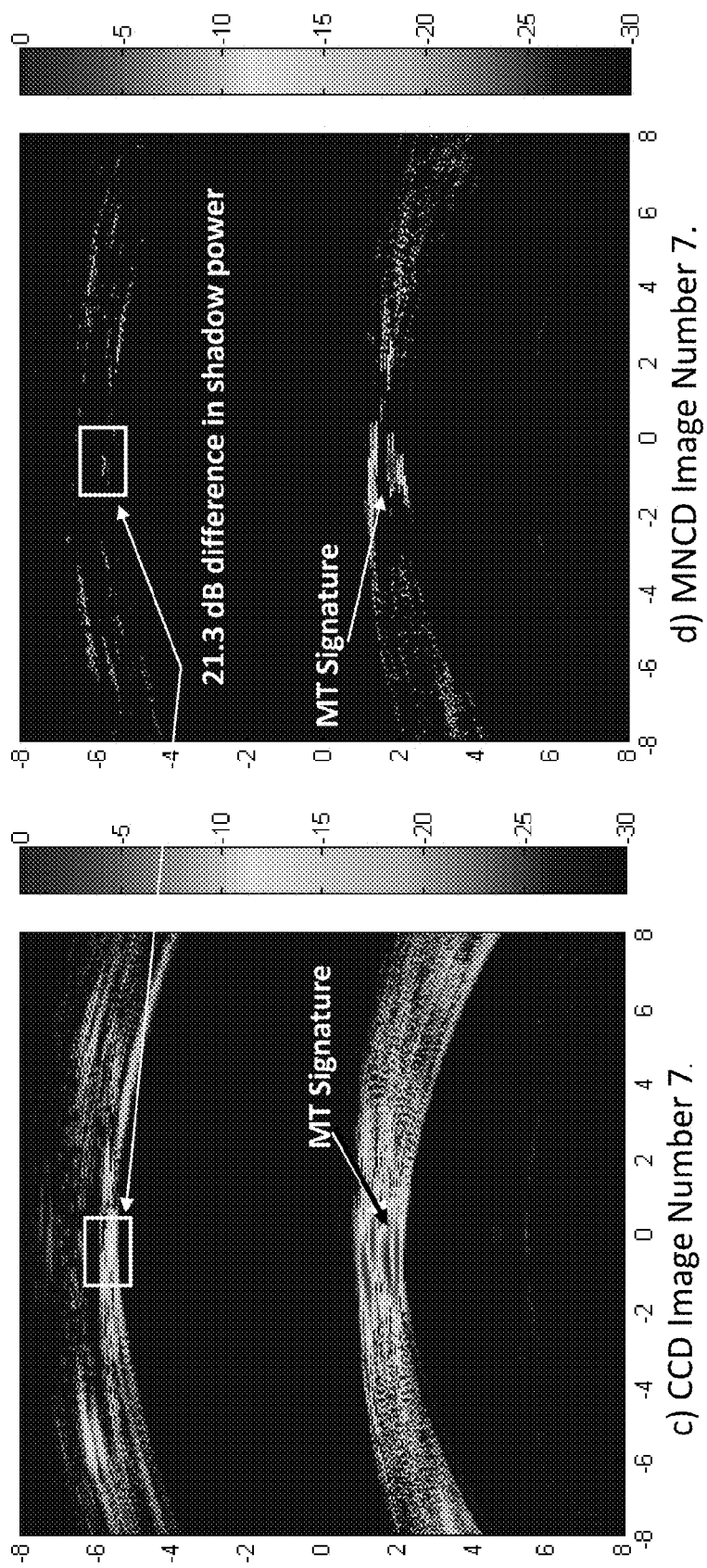

FIG. 7C illustrates CCD (Coherent Change Detection) Image No. 7.

FIG. 7D illustrates MNCD (MTI NonCoherent Change Detection) Image No. 7.

Figures 7E, 7F:
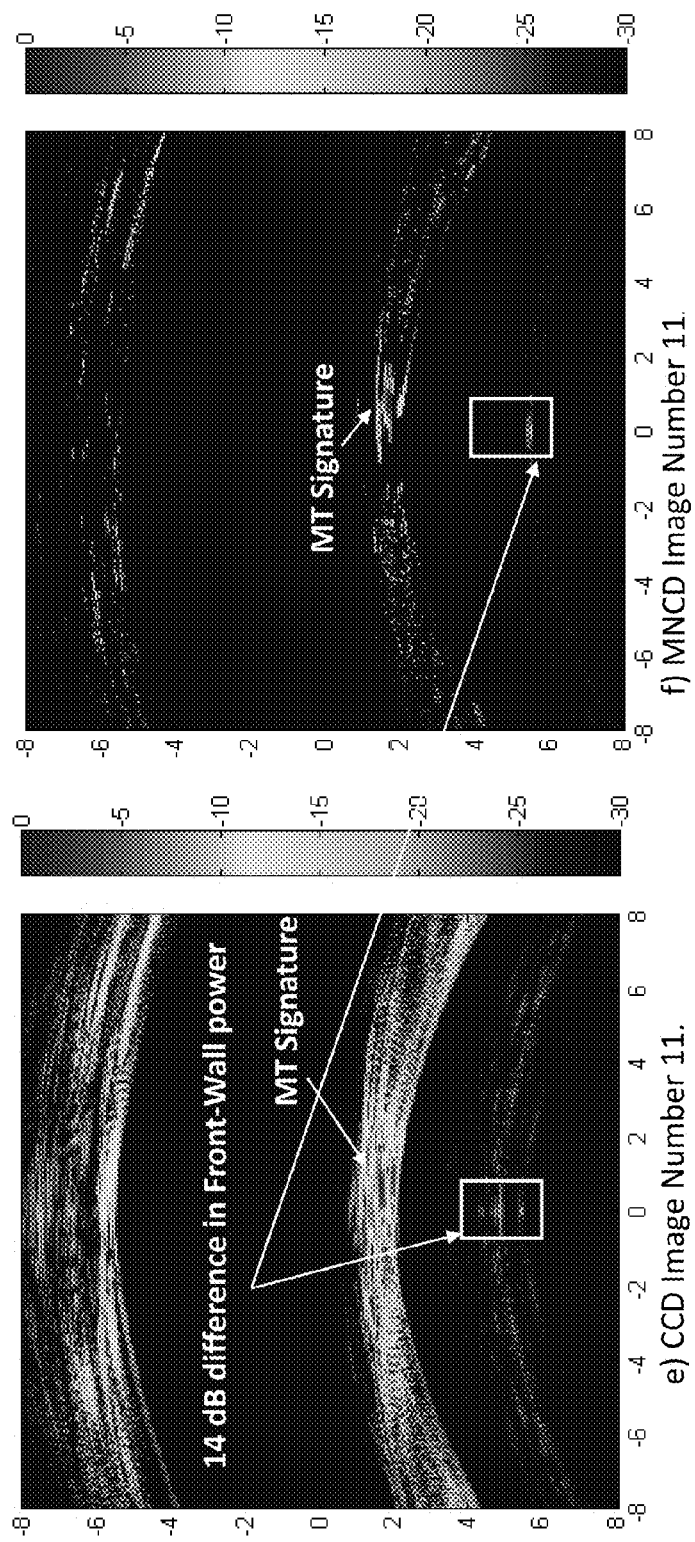

FIG. 7E illustrates CCD (Coherent Change Detection) Image No. 11.

FIG. 7F illustrates MNCD (MTI NonCoherent Change Detection) Image No. 11.

FIG. 8 illustrates the moving target (MT) signatures of change detection images in FIGS. 7A and 7B. Images are of size 0.7×2.5 m with a 30 dB dynamic range.

FIG. 9 illustrates schematically wood and cinderblock building layouts for MTI experiments. The arrows indicate path of the moving target.

FIGS. 10A-D illustrate change detection images of measured data of a wood building. Each image is normalized and uses a dynamic range of 20 dB. "Image Number" refers to the position of the image in the sequence of all change detection images.

Figure 10B:
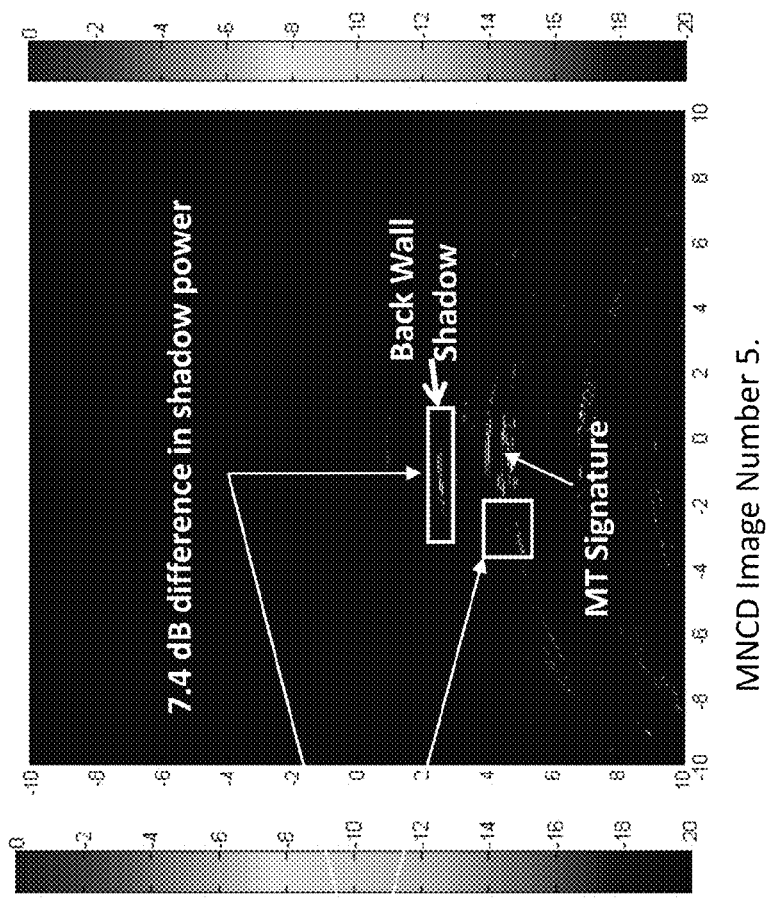
Figure 10A:
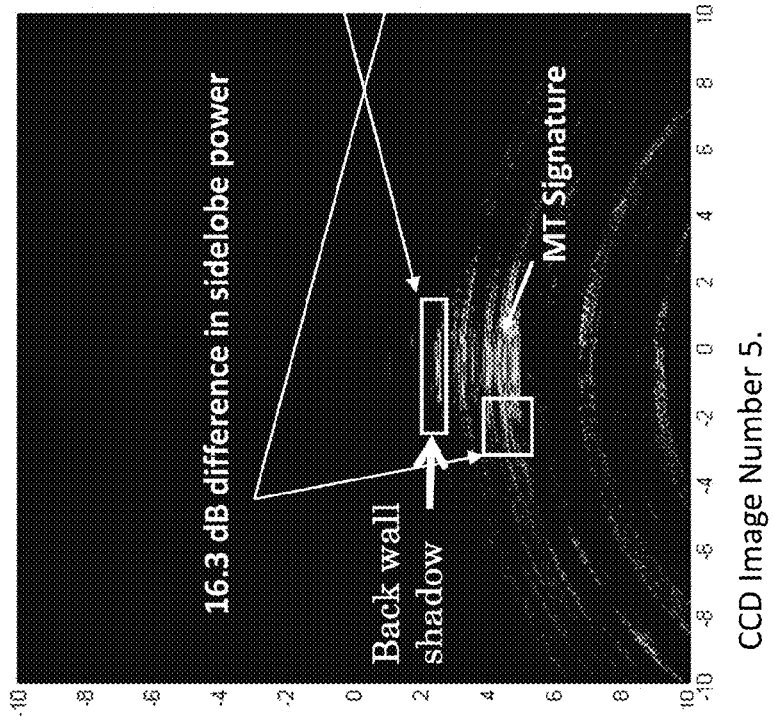
Figure 10D:
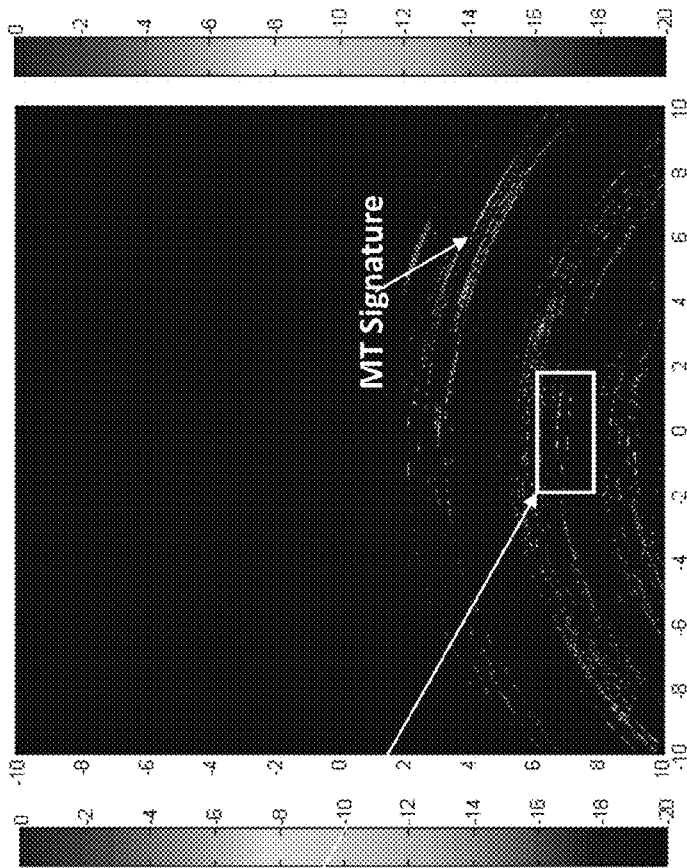
Figure 10C:
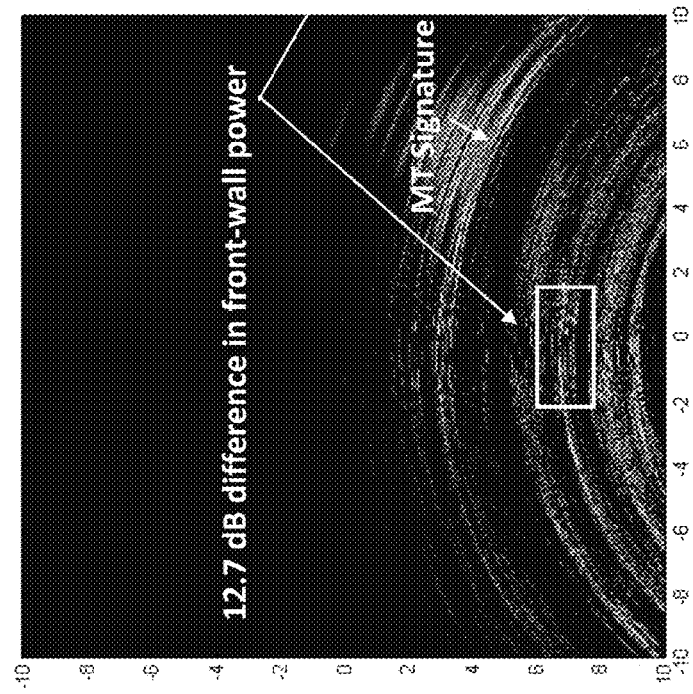

FIG. 10A illustrates CCD image No. 5.
FIG. 10B illustrates MNCD image No. 5.
FIG. 10C illustrates CCD image No. 21.
FIG. 10D illustrates CCD image No. 21.
FIG. 11A illustrates MT signatures of change detection image in FIG. 10A. Images are of size 1.0×4.3 m with a 20 dB dynamic range.

FIG. 11B illustrates MT signatures of change detection image in FIG. 10B. Images are of size 1.0×4.3 m with a 20 dB dynamic range.

FIGS. 12A through 12D are change detection images of measured data of a cinderblock building. Each image is normalized and uses a dynamic range of 20 dB. "Image Number" refers to the position of the image in the sequence of change detection images.

Figures 12A, 12B:
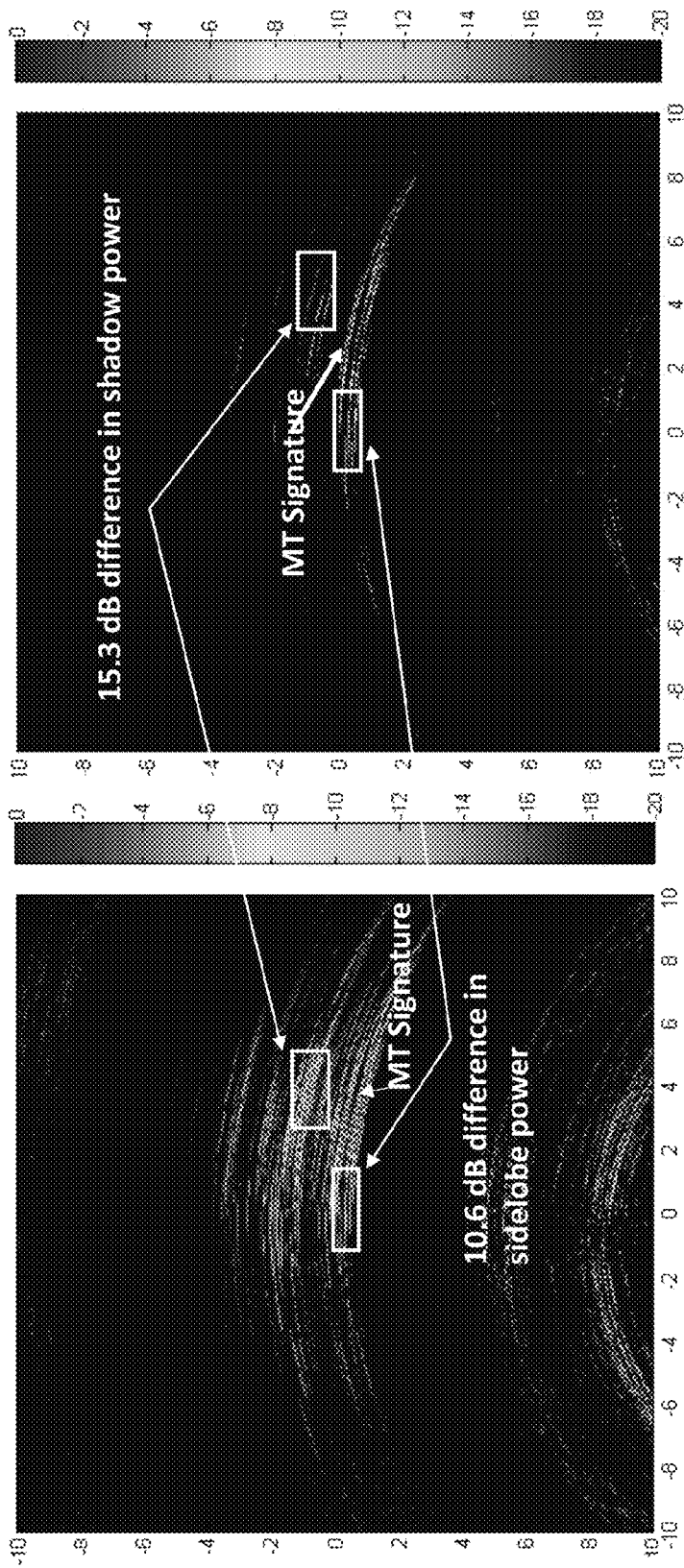
Figures 12C, 12D:
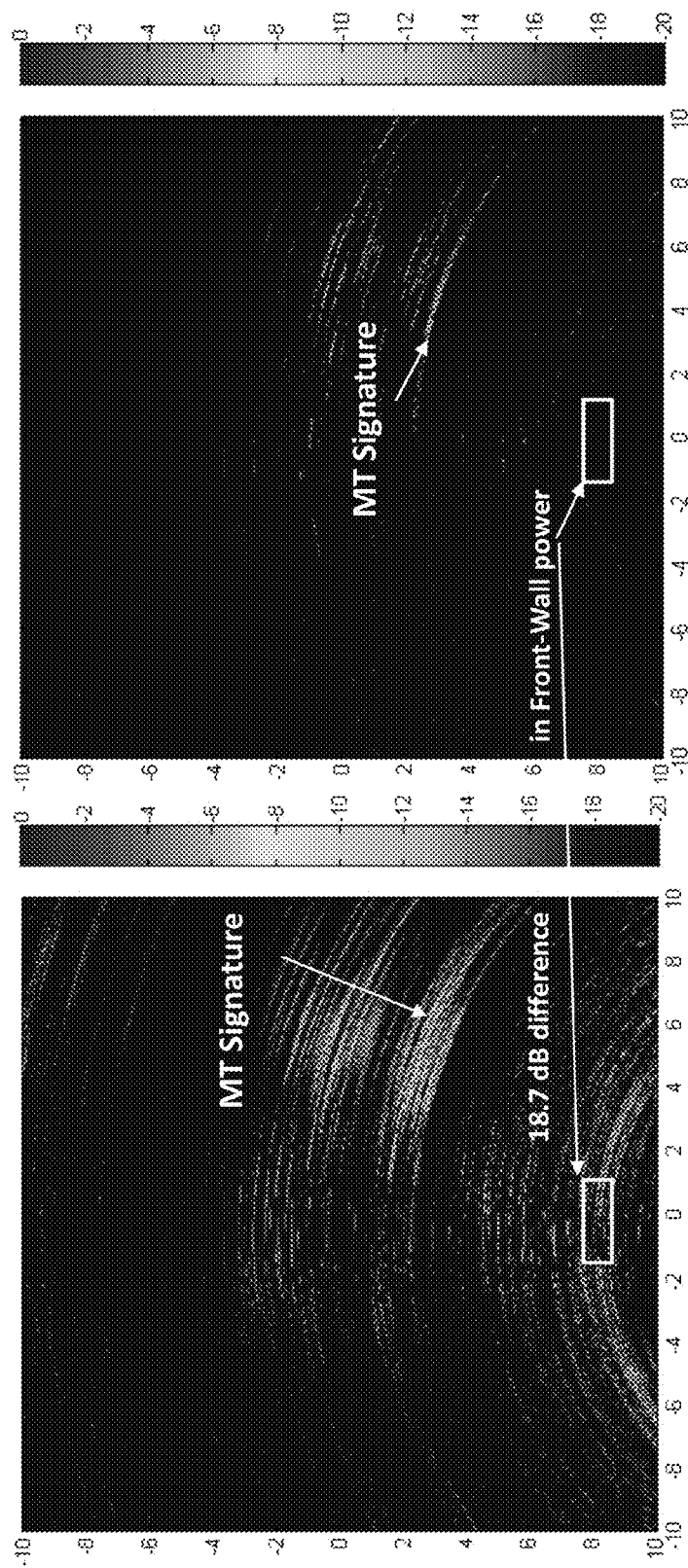

FIG. 12A illustrates a CCD image No. 15.
FIG. 12B illustrates an MNCD image No. 15.
FIG. 12C illustrates a CCD image No. 33.
FIG. 12D illustrates an MNCD image No. 33.

FIG. 13A illustrates the moving target (MT) signatures of the change detection images in FIG. 12A (CCD image). Image is of size 1.0×4 m with a 20 dB dynamic range.

FIG. 13B illustrates the moving target (MT) signatures of the change detection images in FIG. 12B (MNCD image). Image is of size 1.0×4 m with a 20 dB dynamic range.

FIGS. 14A-B illustrate cinderblock front-wall imaging artifacts of CCD and MNCD images. Images are size 4×20 m with a 20 dB dynamic range.

FIG. 14A illustrates CCD image Number 20.

FIG. 14B illustrates MNCD image Number 20.

Figure 15B:
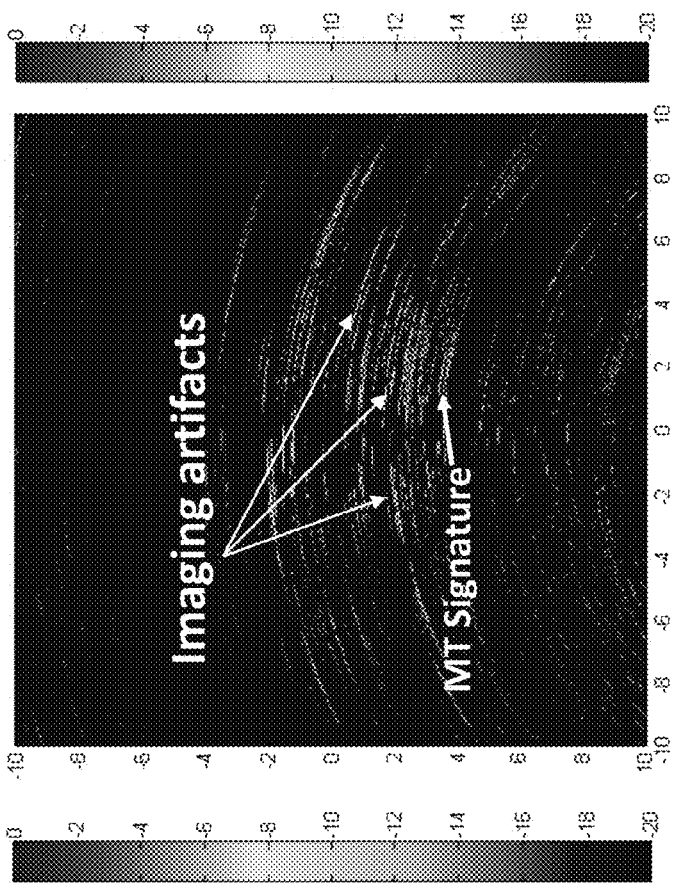
Figure 15A:
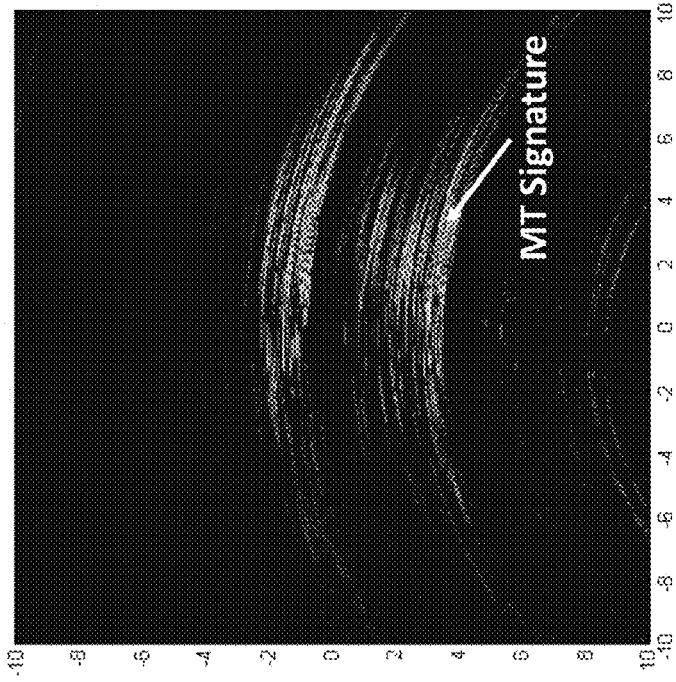

FIGS. 15A and 15B illustrate change detection images of measured data of a cinderblock building. Each image is normalized and uses a dynamic range of 20 dB.

FIG. 15A illustrates CCD image Number 5.

FIG. 15B illustrates MNCD image Number 5.

Figure 16:
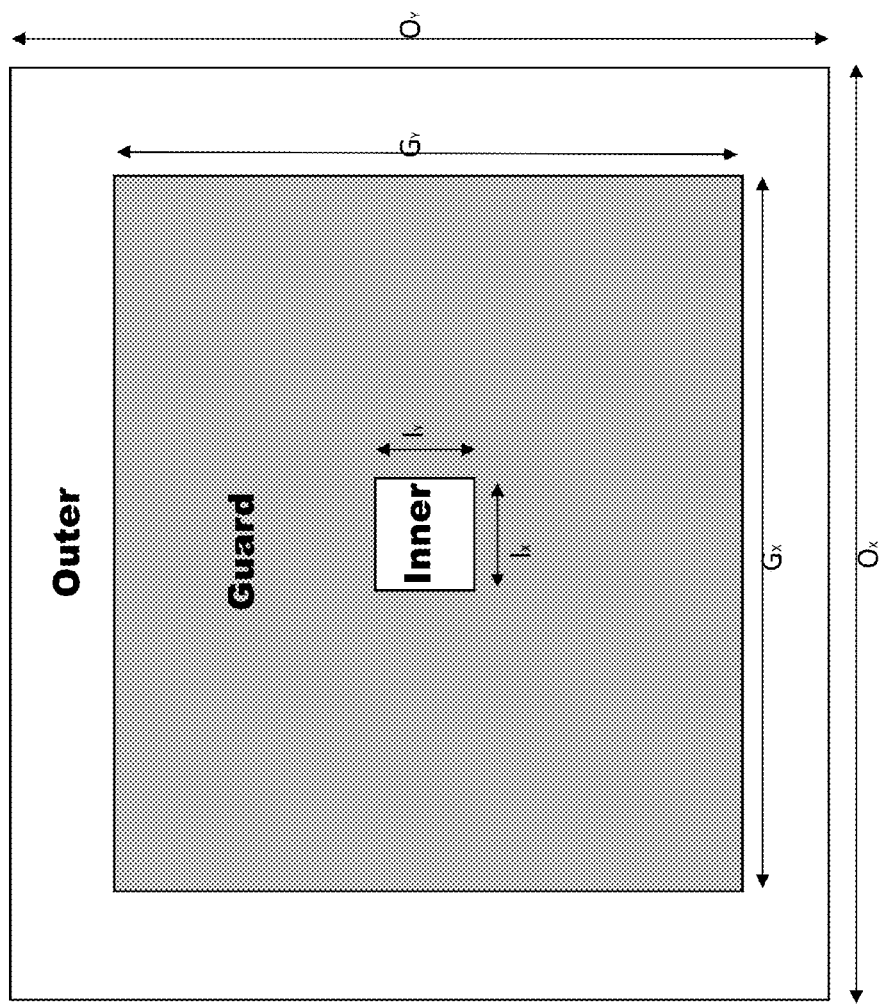

FIG. 16 illustrates an example CFAR window comprising an inner, guard and outer window.

Figure 17:
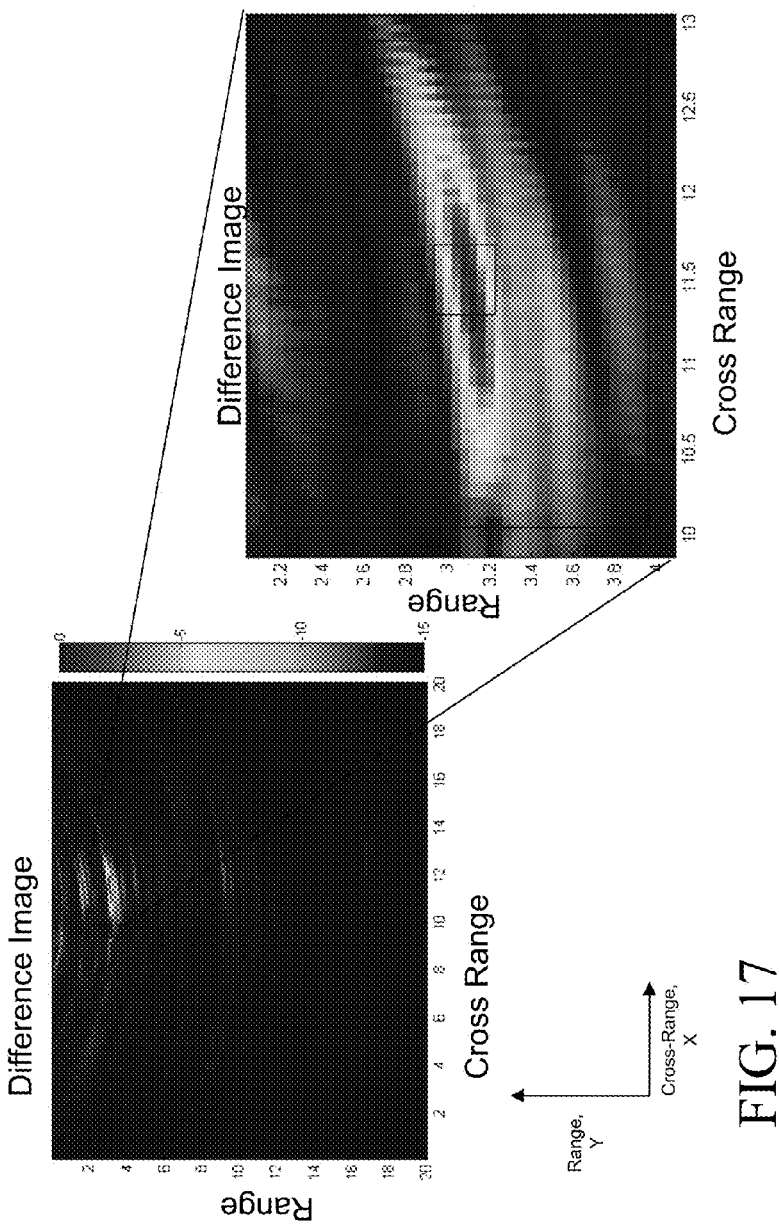

FIG. 17 illustrates an example of a CFAR window placed over the MT signature, where the inner window is overlaid on the MT signature and the outer window covers the background of the local area. The inner window contains pixels with higher energy compared with the pixels contained in the outer window.

Figure 18B:
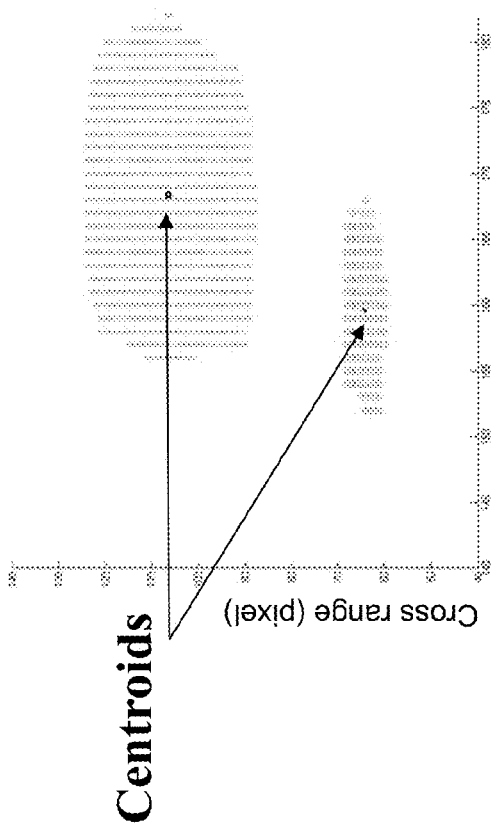
Figure 18A:
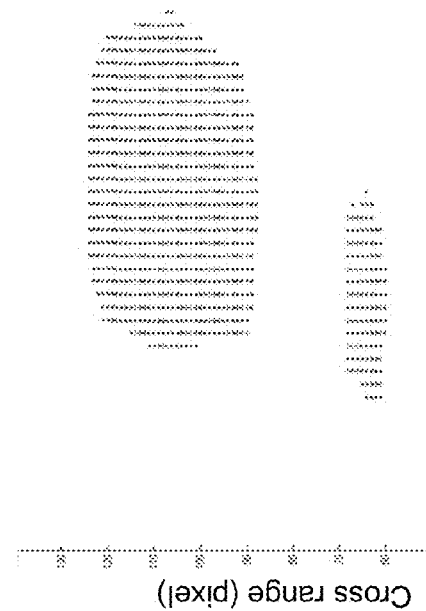

FIG. 18A is a schematic illustration revealing the morphological image that contains points of interest (POIs). When these images are input into a clustering algorithm, two clusters are identified; the clusters and corresponding centroids are shown.

FIG. 18B is an illustration based upon FIG. 18A when these images are input into a clustering algorithm, two clusters are identified; the clusters and corresponding centroids are shown.

FIG. 19 is a schematic block diagram of the adaptive Knee point (KP) algorithm.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

A preferred embodiment moving target indication (MTI) system is comprised of two main components. The first component detects potential moving targets by generating a time series of binary images that contain clusters. The second component of the MTI system tracks the centroid of each cluster thereby indicating any moving target in the building. Both components have been studied individually in past research reported in A. Martone, et al., "Automatic Through the Wall Detection of Moving Targets using Low-Frequency Ultra-Wideband Radar," Proceedings of the IEEE international radar conference, Washington, D.C., May 2010, A. Martone, et al., "An Analysis of Clustering Tools for Moving Target Indication; ARL-TN-5037; U.S. Army Research Laboratory: Adelphi, Md., November 2009, A. Martone, et al., "Through the wall detection of slow moving personnel," Proceedings of the SPIE conference on Radar Sensor Technology XIII, vol. 7308, Orlando, Fla., April 2009, and A. Martone, et al., "Moving Target Indication for Transparent Urban Structures," ARL-TN-4809; U.S. Army Research Laboratory, Adelphi, Md., May 2009, all of which are hereby incorporated by reference. However, the individual components could not be combined since the second component (the tracking of the centroid of each cluster thereby indicating any moving target in the building) required manual input. Specifically, the number of clusters in the binary images (output of the first component) was previously unknown and required manual input into the second component of the system. A methodology for automating this stage of the procedure using a "Adaptive Knee Point" algorithm is described in detail in copending application Ser. No. 13/008,549 entitled "System and Method for Moving Target Detection," filed Jan. 18, 2011.

Referring now to FIG. 3, the Moving Target Indication system comprises the following processing routines: change detection, image formation via a specially adapted version of the back-projection algorithm, constant false alarm rate (CFAR) processing, morphological processing, cluster prediction algorithm, k-Means clustering, and tracking via the Kalman filter. Radar data may be first focused via the back-projection technique to form a sequence of focused images for the given region of interest (ROI); known as ROI images. In the preferred embodiment of FIG. 3, change detection is next applied to the ROI images, thereby creating a series of change detection images. However, generally change detection cannot automatically identify the MT signature located in the change detection image. Performance is improved by applying automatic target detection (ATD) algorithms. The ATD algorithms include the Constant False Alarm Rate (CFAR) algorithm and the morphological processing algorithm. CFAR is utilized to eliminate potential false alarms produced by slow moving targets. The CFAR algorithm performs a test of local contrast that is designed to achieve a constant false alarm rate. It generates a CFAR imagery of binary pixels for each input change detection image. This CFAR image contains clusters of points of interest (POIs) corresponding to either the MT signature or a false alarm. The CFAR algorithm does not eliminate all false alarms. One way to reduce the number of false alarms is to input the POIs into a morphological processing algorithm. Briefly, the morphological processing algorithm implements a dilation and erosion procedure. Dilation is used to grow the POI clusters and erosion is used to shrink the size of each POI cluster back to its original size. The morphological algorithm generates a morphological image for each input CFAR image. Before POIs are input into a tracking algorithm, reduction of their number is desired. The number of POIs is refined by first identifying the number of clusters in each morphological image and then implementing a cluster algorithm. One clustering routine used is the K-Means algorithm.

The tracker algorithm is intended to reduce the number of false alarms and segregate targets from both clutter and one another as they move through buildings. The centroids generated by the clustering algorithm serve as inputs to the tracker; so it is possible to have multiple tracker inputs even when a single moving target is present. The centroids may indicate the true position of a target or false alarms. The tracker estimates the correlation between each centroid and the existing tracks and then associates the existing tracks with the most correlated centroid. Non-assigned centroids are used to initiate new tracks and outdated tracks are deleted. A Kalman filter determines the present track position and predicts the next measurement.

Each processing routine is described in detail in copending application Ser. No. 13/008,549, hereby incorporated by reference. The cluster prediction algorithm i) automatically determines the number of clusters present in the binary images, ii) reduces false alarms in the binary images, iii) combines the detection and tracking components of the MTI system thereby automating the entire system.

Previous Methodology and Fundamentals of Change Detection

In past research, coherent change detection was implemented as described in copending application Ser. No. 13/008,549. The change detection paradigm of a preferred embodiment may be utilized to process a sequence of focused images generated by a stationary radar for a region of interest (ROI) inside a building. The stationary objects in the ROI remain in the same position/location in each image; however, moving personnel are at different locations. The moving personnel are detected by subtracting the focused images, thereby eliminating the stationary objects and identifying the moving target (MT) signature. The effectiveness of this time domain approach has been demonstrated for people walking inside wood and cinderblock buildings.

Coherent change detection is defined in the following paragraph. First, I(x, y) may be defined as the focused image for a region of interest, where "x" and "y" are down-range and cross-range indexes. Each pixel in I(x,y) consists of magnitude, $\alpha$, and phase, $\theta$, information represented as $\alpha e^{j\theta}$. Next, a sequence of ROI images may be defined as:

$$\{I_1(x,y), I_2(x,y), \ldots, I_N(x,y)\} \quad (1)$$

where each image is of the same ROI at a different time. Coherent change detection may then be defined as $$\delta(x,y) = |I_r(x,y) - I_k(x,y)| \quad (2)$$

where $k \neq r$, and $I_r(x,y)$ is the reference image. Each pixel in $\delta(x,y)$ has the magnitude $\sqrt{\alpha_k^2 + \alpha_r^2 - 2\alpha_k\alpha_r\cos(\theta_k - \theta_r)}$.

Preferred Embodiment Non-Coherent Change Detection Technique

Non-coherent change detection may be defined as $$\Delta(x,y) = |I_r(x,y)| - |I_k(x,y)| \quad (3)$$

where each pixel in the non-coherent change detection image has the magnitude $|\alpha_r| - |\alpha_k|$. The positive magnitudes in $\Delta(x,y)$ are generated by $|\alpha_r|$, which indicates a contribution from $I_r(x,y)$. The negative magnitudes in $\Delta(x,y)$ are generated by $|\alpha_k|$, which indicates a contribution from $I_k(x,y)$. The non-coherent change detection approach can therefore be used to determine the ROI image (i.e. $I_r(x,y)$ or $I_k(x,y)$) that produces the MT signature, back-wall shadow, front-wall response, and sidelobe imaging artifacts generated in $\Delta(x,y)$.

The processing of the preferred embodiment non-coherent change detection technique is illustrated in FIG. 4. This technique determines the MT signature for a given reference image, $I_r(x,y)$, by first generating a set of M non-coherent change detection images:

$$\{\Delta_r(1,x,y), \ldots \Delta_r(k,x,y), \ldots \Delta_r(M,x,y)\} \quad (4)$$

where $$\Delta_r(k,x,y) = |I_r(x,y)| - |I_{\gamma_k}(x,y)| \quad (5) \text{ or}$$

and $M \leq N$, $1 \leq \gamma_k \leq N$ for a given k, $1 \leq r \leq N$, $\gamma_k \neq r$. Note the following: Equation 4 considers M of N ROI images; $I_r(x,y)$ is constant for all k; r is the index indicating the reference image; and the parameter $\gamma_k$ is the index for an ROI image and is dependent upon k. The choices for $\gamma_k$ and M are application dependent and discussed further in the following.

Equations 4 and 5 indicate that the MT signature, associated with $I_r(x, y)$, is positive in magnitude and constant in position. In addition, all pixels in image $\Delta_r(k,x,y)$ associated with $I_{\gamma_k}(x,y)$ are negative in magnitude and can be eliminated since these pixels do not contribute to the MT signature of $I_r(x,y)$. Therefore, the second step of the proposed change detection technique is to eliminate the negative magnitudes in each image of Equation 4:

$$\Lambda_r(k, x, y) = \begin{cases} \Delta_r(k, x, y) & \Delta_r(k, x, y) \geq 0 \\ 0 & \Delta_r(k, x, y) < 0 \end{cases} \quad (6)$$

The processing of Equation 6 produces the following sequence of images:

$$\Lambda = \{\Lambda_r(1,x,y), \ldots \Lambda_r(M,x,y)\} \quad (7)$$

The third step of the proposed change detection technique is to average the images in $\Lambda$ to enhance the MT signature. It is possible that the MT signature is severely attenuated in one or more images in $\Lambda$. The minimization process (step 4 in FIG. 4) selects the most attenuated MT signature in $\Lambda$. Therefore, the severely attenuated MT signature becomes the dominate feature for the minimization process and is characterized as the MT signature for the reference image. In order to prevent a severely attenuated MT signature from being the dominant feature, all MT signatures in $\Lambda$ are averaged as follows:

$$\Theta_r(i, x, y) = \frac{\Lambda_r(i+1, x, y) + \Lambda_r(i, x, y)}{2} \quad (8)$$

where $1 \leq i \leq M-1$, and produces the following sequence of averaged images:

$$\Theta = \{\Theta_r(1,x,y), \ldots \Theta_r(M-1,x,y)\} \quad (9)$$

Note that, as indicated in (8), the averages described herein are calculated using two samples. However, the number of samples used to calculate the averages can be increased depending on the application. The final step of the proposed technique is to eliminate sidelobe imaging artifacts using the following minimization procedure:

$$\Psi_r(x, y) = \min_i \{\Theta_r(i, x, y)\} \quad (10)$$

The minimization procedure attenuates sidelobes associated with the MT signature, back-wall shadow, and front-wall response. The minimization procedure is used since the magnitude variations associated with the moving target are less than the magnitude variations associated with the sidelobes, as described in greater detail in L. Nguyen, "SAR imaging technique for reduction of sidelobes and noise," in Proceedings of SPIE, vol. 7308, (2009) hereby incorporated by reference. The minimum pixel value of a sidelobe pixel should therefore be less than that of the MT signature due to this larger variation of pixel values associated with the sidelobes. For example, consider the scenario of a person walking cross-range to a radar sensor (from left to right). This scenario has been modeled using near-field scattering simulations (the details of the simulations are discussed in SIMULATION RESULTS). ROI images are generated using the back-projection procedure on the simulated data, as described further in J. McCorkle, "Focusing of Synthetic Aperture Ultra Wideband Data," in Proceedings of the IEEE International Conference on Systems Engineering, Dayton, Ohio, August 1991, pp. 1-5 (hereby incorporated by reference). The preferred embodiment change detection technique processes the sequence of ROI images to generate the sequence of images in $\Theta$ (Equation 9). The minimization technique (Equation 10) processes the images in $\Theta$ and the results are compared, FIGS. 5A & B, with the results of the maximization technique:

$$\max_i \{\Theta_r(i, x, y)\}.$$

The maximization technique represents the worst case scenario of sidelobe reduction and is compared to the minimization technique to illustrate the significance of sidelobe reduction from the minimization technique. The dynamic range for both images is 50 dB (−95 dB to −145 dB). A representative pixel of the MT signature and the sidelobe imaging artifacts is chosen to compare power levels between FIGS. 5A and 5B. As is shown, a 4.9 dB difference is observed between the MT signature in FIGS. 5A and 5B. A 29.9 dB difference is observed between the sidelobes of FIG. 5A and those of FIG. 5B. This translates into an increase of approximately 25 dB in peak-to-sidelobe ratio. Based on these large power differences, the minimization technique preserves the power associated with the MT signature while greatly attenuating the power associated with the sidelobes.

$\Psi_r(x, y)$ constitutes the final change detection image generated by the proposed change detection technique for the reference image $I_r(x,y)$. Thus, the MT signature in the reference image is identified and the trajectory of the moving target is determined by changing the reference image index, r. The final set of change detection images are defined as $$\Psi = \{\Psi_1(x,y), \ldots \Psi_N(x,y)\} \quad (11)$$

Simulation Results

The near-field scattering simulations are computed using XPATCH. XPATCH is a physical optics (PO) based code that uses a ray-tracing technique to calculate the scattering field from a target, as referenced in T. Dogaru, L. Nguyen, C. Le, "Computer Models of the Human Body Signature for Sensing Through the Wall Radar Applications," ARL-TR-4290, U.S. Army Research Laboratory: Adelphi, Md., September (2007), hereby incorporated by reference. The simulated radar scattering data are computed for 24 moving target positions shown in FIG. 6, where "X" denotes range and "Y" denotes cross-range. The building structure consists of four brick walls and a ground-plane. The walls have a thickness of 8" and are modeled as brick with a dielectric constant of 3.8-j0.24. The ground-plane has a dielectric constant of 6.8 (dry soil). The antenna array is located 8 m from the front wall. The antenna array consists of effectively 17 monostatic antennas distributed across a 2 m aperture. For a given antenna position 2404 frequency bins of in-phase and quadrature (I/Q) information is collected. The 2404 frequency bins form the frequency domain representation of an I/Q range profile, and the range profile is constructed via an inverse fast Fourier transform (IFFT). Note that a range profile is generated for each antenna position. The bandwidth of the collected frequency information is 4 GHz and ranges from 0.1-4.1 GHz.

The 17 I/Q range profiles are collected for each moving target position. For a given moving target position, the 17 I/Q range profiles constitute one frame of data and each frame of data is used to form an ROI image. The moving target positions are spaced 0.15 m apart. The total distance covered by the moving target is 3.6 m.

To form an ROI image, each I/Q range profile is first windowed using a Hanning window of size 2404 (i.e. the size of the range profile). The window size is chosen to make the bandwidth of each range profile similar to that of radar measurements (discussed in EXPERIMENTAL RESULTS). The windowed range profile is next converted to a time domain sequence using the IFFT. The time domain sequence is next processed by the back-projection algorithm (as described in, inter alfa, J. McCorkle, "Focusing of Synthetic Aperture Ultra Wideband Data," in Proceedings of the IEEE International Conference on Systems Engineering, Dayton, Ohio, August 1991, pp. 1-5) to focus the raw data. Each ROI image is of size 8×8 m and contains 400×400 pixels with a pixel spacing of 0.02×0.02 m. 24 ROI images are generated (i.e. N=24).

The proposed moving target indication (MTI) non-coherent change detection (MNCD) technique is used to process the N=24 ROI images to produce $\Psi$. M=8 non-coherent change detection images are generated where:

$$\{\gamma_1, \ldots \gamma_8\} = \{r-4, r-3, r-2, r-1, r+1, r+2, r+3, r+4\}$$

for r>4 and r≤N−4, where r is the index for the reference image. $\gamma_k$ is chosen to select the ROI images "closest" to the reference image. The closest ROI images have sidelobe patterns similar to the sidelobe patterns in $I_r(x,y)$. If the distance between the MT signatures of $I_r(x,y)$ and $I_{\gamma_k}(x,y)$ is large, then the sidelobe patterns of the images are unaligned and will not cancel effectively. When r≤4 and r>N−4, i.e. the boundary conditions, $\gamma_k$ is selected to create a set of ROI images that contains the closest MT signature to the MT signature in $I_r(x,y)$. For example, if r=3, then $\{\gamma_1, \ldots \gamma_8\} = \{1, 2, 4, 5, 6, 7, 8, 9\}$.

Three pairs of images are shown in FIGS. 7A-F. Each pair consists of a change detection image generated by the MNCD technique, i.e. the MNCD image, and by the coherent change detection (CCD) technique (Equation 2), i.e. the CCD image. The images in FIGS. 7A-F represent a subset of all the images that were generated and are shown to illustrate key difference between the MNCD and CCD techniques. Each image in FIGS. 7A-F is normalized by dividing the magnitude of each pixel by the maximum magnitude of the image. As is shown in FIGS. 7A-F, the MT signature is clearly visible and identifiable in both the MNCD and CCD images. FIGS. 8A and 8B illustrates a close-up of the MT signature in FIGS. 7A and 7B and reveal that the MT signature generated using the MNCD technique is very similar to the MT signature generated using the CCD technique. If the MT signature generated by the MNCD technique was severely attenuated, than automatic target recognition and tracking results could be adversely affected.

The back-wall shadow, front-wall response, and sidelobe imaging artifacts in the MNCD images of FIGS. 7B, 7D and 7F are significantly attenuated compared to those artifacts in the CCD images (FIGS. 7A, 7C and 7E). To develop a more quantitative understanding of the attenuation, the average power of each artifact category (i.e. sidelobe, shadow, and front-wall) in the MNCD image is estimated and compared to the corresponding average power in the CCD image. The results are illustrated in FIGS. 7A-F. The "red box" window in each image indicates the area of pixels that are averaged (note that the window shown in each figure is not drawn to scale). A 24.8 dB attenuation is observed for the sidelobes in the MNCD image using a 1.1×0.4 m (range x cross-range) window. A 21.3 dB attenuation is observed for the back-wall shadow in the MNCD image using a 0.3×0.6 m window.

A 14 dB attenuation is observed for the front-wall response in the MNCD image using a 1.3×0.08 m window. The results of this quantitative comparison indicate that the MNCD technique is significantly more effective in attenuating imaging artifacts compared to the CCD technique.

Experimental Results

In addition to processing modeling data, the MNCD and CCD techniques are used to process measurement data collected by the U.S. Army Research Laboratory's (ARL) ground-based Synchronous Impulse Reconstruction (SIRE) radar. The SIRE radar is an impulse-based, UWB imaging radar with an effective bandwidth covering 500 MHz to 1.5 GHz, a frequency range appropriate for sensing through the wall (STTW) applications. As is illustrated in FIG. 1, the SIRE radar employs 2 transmit antennas and 16 receiver antennas mounted in a wooden structure and attached to the top of a Ford Expedition. The receive antennas are equally spaced across a linear 2 m long aperture. The two impulse transmitters are located at each end of the wooden structure and slightly above the receive array. The SIRE radar constructs a high-resolution (0.15 m) down-range profile through ARL-developed signal-processing techniques, as described in J. McCorkle, "Focusing of Synthetic Aperture Ultra Wideband Data," in Proceedings of the IEEE International Conference on Systems Engineering, Dayton, Ohio, August 1991, pp. 1-5, hereby incorporated by reference.

For the experiments described in this section, the SIRE radar remains stationary and the downrange swath measured by the radar extends from approximately 8 to 30 m. The received measurements are effectively buffered in one downrange profile from each receive channel, and the time required to assemble these profiles represents one frame of data. After buffering the data from one frame, another set of downrange profiles are collected from each receive channel.

The down range profiles for each frame are directly processed (without windowing or filtering) using the back-projection algorithm to form a set N=34 ROI images. Each ROI image is of size 10×10 m and contains 500×500 pixels with a pixel spacing of 0.02×0.02 m. The ROI images are processed using the CCD and MNCD techniques with the same parameter set described in the above SIMULATION RESULTS.

Two operational scenarios are considered. The first scenario is of a person walking inside a wood building as depicted in FIG. 9 (left side). Two pairs of images are shown in FIGS. 10A-10D. Each pair of images consists of a MNCD image and a CCD image. The images in FIGS. 10A-10D represent a subset of all the images that were generated and are shown to illustrate key difference between the MNCD and CCD techniques. Each image in FIGS. 10A-10D is normalized relative to the peak pixel value and has a dynamic range of 20 dB. As is shown in FIGS. 10A-10D, the MT signature is clearly visible and identifiable in both the MNCD and CCD images. Closer examination of the MT signature, FIGS. 11A-11B, reveals that the MT signature generated using the MNCD technique is slightly attenuated and remains identifiable. Note also that the MT signature in FIG. 11B (from measurement data) is more attenuated than the MT signature in FIG. 8B (from modeled data) indicating that the fidelity of measurement data is less than that of the model data (as expected).

The sidelobe, shadow, and front-wall artifacts in the MNCD images of FIGS. 10B & 10D are significantly attenuated compared to those artifacts in the CCD images (FIGS. 10A & 10C). Similar to the analysis conducted for the modeling data, the average power of each artifact category in the MNCD image is estimated and compared to the corresponding average power in the CCD image. The results are illustrated in FIGS. 10A-10D. The "red box" window in each image indicates the area of pixels that are averaged. A 16.3 dB attenuation is observed for the sidelobes in the MNCD image using a 1×1 m window. A 7.4 dB power attenuation is observed for the back-wall shadow in the MNCD image using a 0.2×1.2 m window. A 12.7 dB power attenuation is observed for the front-wall response in the MNCD image using a 0.4×1 m window. The results of this comparison indicate that the MNCD technique is significantly more effective in attenuating imaging artifacts compared to the CCD technique.

The second operational scenario is of a person randomly walking inside a cinderblock building (FIG. 9, right side). The radar is position 38° off the broadside position. The off-broadside angle was selected in an attempt to reduce imaging artifacts present in the change detection images due to large reflections from the wall. See, A. Martone, K. Ranney, R. Innocenti, "Automatic Through the Wall Detection of Moving Targets using Low-Frequency Ultra-Wideband Radar," in Proceedings of the IEEE International radar conference, Washington, D.C., (May 2010), hereby incorporated by reference. Two pairs of images are shown in FIGS. 12A-12D. Each pair of images consists of a MNCD image and a CCD image. Each image in FIGS. 12A-12D is normalized relative to the peak pixel value and has a dynamic range of 20 dB. The observations illustrated in FIGS. 12A-12D (cinderblock building) are similar to those illustrated in FIGS. 7A-7F (modeled brick building) and FIGS. 10A-10D (wood building) and are summarized as: 1) the MT signature is clearly visible and identifiable in both the MNCD and CCD images; 2) the MT signature, FIG. 13B, generated using the MNCD technique is more attenuated compared to the MT signature generated using the CCD technique, FIG. 13A; 3) the back-wall shadow, front-wall response, and sidelobe imaging artifacts in the MNCD images of FIGS. 12B & 12D are significantly attenuated compared to those artifacts in the CCD images of FIGS. 12A & 12C. Power level differences for the artifacts are illustrated in FIGS. 12A-12D. The window sizes used for averaging are as follows: 0.6×1.4 m for sidelobe; 0.3×1.4 m for shadow; 0.6×1 m for front-wall.

Not all imaging artifacts generated using the MNCD technique are significantly attenuated compared to those generated by the CCD technique. For example, consider the cinderblock front-wall response in the CCD and MNCD images of FIGS. 14A and 14B, respectively. In general the imaging artifacts generated using the MNCD technique appear more attenuated then those generated by the CCD technique, however, this difference is insignificant. In another example, consider the CCD and MNCD images in FIGS. 15A and 15B. As is shown significant imaging artifacts are present in the MNCD image and not the CCD image. These imaging artifacts occur when the averaging process (Equation 8) does not properly enhance the MT signature. As discussed in CHANGE DETECTION TECHNIQUE (above), if the MT signature is severely attenuated then it becomes the dominate feature during the minimization process and is present in the MNCD image. The attenuated MT signature has power similar to imaging artifacts; hence the image in FIGS. 15A and 15B. The choice for M (i.e. M=8) and the number of averages (i.e. two averages) are chosen to prevent attenuated MT signatures and to minimize sidelobe artifacts for the majority of MNCD images. It is verified that the majority of change detection images generated by the MNCD technique contains less imaging artifacts than the set of images generated by the CCD technique.

The Moving target indication (MTI) non-coherent change detection (MNCD) technique is a novel and effective method for identifying the MT signature and eliminating imaging artifacts. The simulation and experimental results demonstrated the effectiveness of the proposed method. In rare cases, the anticipated enhancement of the MNCD image is not realized (see FIGS. 15A and 15B). In these cases, imaging artifacts are retained when the averaging process (Equation 8) does not properly enhance the MT signature; the phenomenon is dependent on the number of averages taken and M. As a whole, however, the results indicated a significant attenuation of imaging artifacts observed in the MNCD image relative to those observed in the coherent change detection (CCD) image. The simulation results indicated a 24.8 dB attenuation of the sidelobes, a 21.3 dB attenuation of the shadow, and a 14 dB attenuation of the front-wall response in the MNCD images. The wood building experimental results indicated a 16.3 dB attenuation of the sidelobes, a 7.4 dB attenuation of the shadow, and a 12.7 dB attenuation of the front-wall response in the MNCD images. The cinderblock building experimental results indicated a 10.6 dB attenuation of the sidelobes, a 15.3 dB attenuation of the shadow, and a 18.7 dB attenuation of the front-wall response in the MNCD images.

Constant False Alarm Rate (CFAR) Approach

Interpretation of the resulting MT signature is still challenging after change detection. For example, change detection cannot automatically identify the MT signature located in the difference image and the MT signature can only be identified through visual inspection of a sequence of difference images. Therefore, it is not possible to implement additional signal processing techniques like classification using a single difference image. Another challenge with change detection is that sidelobe artifacts are produced in the difference image, which confuse the true moving target location.

A way to improve user interpretation of the resulting difference image is to apply the CFAR algorithm. CFAR is a well-established approach to eliminating potential false alarms. Typically, the algorithm performs a test of local contrast that is designed to achieve a constant false alarm rate as reported in Gandhi, P. P. & Kassam, S. A., "Analysis of CFAR Processors in Homogeneous Background," *IEEE Transactions on Aerospace and Electronic Systems* July 1988, 24 (4), 427-445, hereby incorporated by reference.

A further description of the CFAR process, as well as the outputting of morphological output images, is presented in application Ser. No. 13/008,549 entitled "System and Method for Moving Target Detection," filed Jan. 18, 2011, hereby incorporated by reference.

Tracker Algorithm

The tracker algorithm is intended to reduce the number of false alarms and segregate targets from both clutter and one another as they move inside a building. The centroids generated by the clustering algorithm serve as inputs to the tracker; so it is possible to have multiple tracker inputs even when a single moving target is present. These centroids may indicate the true position of a moving target or false alarms. The tracker estimates the correlation between each centroid and the existing tracks and then associates the existing tracks with the most highly correlated (i.e., most reasonable) centroid. Non-assigned centroids are used to initiate new tracks and outdated tracks are deleted. A Kalman filter determines the present track position and predicts the next measurement.

Clustering Analysis

The k-Means algorithm is referenced Wilpon, J., et al., "A Modified K-means Clustering Algorithm for Use in Isolated Work Recognition," IEEE Transactions on Acoustics, Speech and Signal Processing vol. 33, no. 3, July 1985, 587-594, hereby incorporated by reference. Note that the k-Means algorithm requires the number of clusters present in the morphological images and is provided by the cluster prediction algorithm described in the section entitled Cluster Prediction Algorithm. A cluster is defined as a group of one or more POIs that are close to one another in the image. The total number of clusters present in the morphological image referred to as T. For example, consider the POIs in FIG. 18A, a morphological image where each POI corresponds to a blue diamond. When these images are input into a clustering algorithm, two clusters are identified; the clusters and corresponding centroids are shown in FIG. 18B. The POIs connected to each other form a cluster as illustrated in FIG. 18B. As is shown, T=2 clusters are present in the morphological image. Once the number of clusters in the image is known, the k-Means algorithm is used to indicate the centroid of each cluster.

The k-Means algorithm identifies the centroids of the POIs by an iterative procedure. This iterative procedure minimizes the square-error between centroid estimates and their corresponding POIs. It should be noted that the clusters identified by the clustering algorithm are not unique and it is possible that the centroid locations differ for different iterations of the clustering algorithm. A block diagram of the k-Means algorithm is shown in FIG. 19.

A further description of the clustering analysis, cluster prediction algorithm, and the K-Means Algorithm is set forth in application Ser. No. 13/008,549 entitled "System and Method for Moving Target Detection," filed Jan. 18, 2011, hereby incorporated by reference.

The moving target indication system of the present invention can be used for commercial applications including (1) law enforcement, (2) search and rescue, (3) building surveillance, (4) vehicle tracking on highways or in remote locations.

As used herein, the terminology "target" means a person or persons, or portion thereof, animal or animals, thing, object, or a combination thereof.

As used herein "time progression radar images" means taking images over time as time progresses; not necessarily at fixed intervals of time.

As used herein the terminology "point of interest" or "points of interest" refer to an signature or area in the image which appears to be a target but may or may not be a target; i.e., potentially the point of interest may be a target; subject to further processing or testing.

As used herein, the "energy" corresponds to the intensity of the image pixels.

As used herein the terminology "processor" includes computer, controller, CPU, microprocessor; multiprocessor, minicomputer, main frame, personal computer, PC, coprocessor, and combinations thereof or any machine similar to a computer or processor which is capable of processing algorithms.

As used herein the terminology the terminology "process" means: an algorithm, software, subroutine, computer program, or methodology.

As used herein the terminology "target signature" means the characteristic pattern of a target displayed by detection and identification equipment.

As used herein, the terminology "algorithm" means: sequence of steps using computer software, process, software, subroutine, computer program, or methodology.

As used herein the terminology "succession" means the act or process of following in order or sequence, but is not limited to sequential order. As used herein the terminology "succession" refers to a later taken image being compared with an earlier taken image.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A method capable of determining the presence of a moving target behind a wall or barrier based upon a time progression images of the region of interest comprising:
   using ultra-wideband low frequency radar, transmitting a low frequency radar signal;
   receiving the low frequency radar signal from the region of interest;
   providing a plurality of images of the region of interest that may contain a moving target signature taken at different points in time;
   utilizing at least one processor, selecting a reference image from the plurality of images;
   forming a predetermined number of difference images of the region of interest; each difference image being formed by subtracting the absolute value of the pixels of one of the plurality of images from the absolute values of the pixels of the reference image;
   eliminating the negative pixel values in the predetermined number of difference images;
   minimizing the side lobes; and
   forming a combined difference image for each reference image,
   selecting another reference image from the plurality of images and performing the steps of forming a plurality of difference images, eliminating the negative pixel values, and minimizing the side lobes for each selected reference image to form a set of combined difference images which contain a moving target signature.

2. The method of claim 1 further comprising the step of averaging the resulting predetermined number of difference images for each reference image prior to minimizing the side lobes.

3. The method of claim 1 wherein the images are ultra-wideband radar images taken at low frequencies.

4. The method of claim 1 wherein the step of minimizing the sidelobes is performed to eliminate sidelobe imaging artifacts occurring when the predetermined plurality of images are taken at relatively large time intervals such that the sidelobes present in the predetermined plurality of images are unaligned and do not cancel effectively when forming the predetermined number of difference images.

5. The method of claim 1 wherein the step of forming a predetermined number of difference images comprises,
   selecting a reference image;
   selecting from the plurality of images an image taken prior in time to the reference image and an image taken after the reference image,
   creating a difference image by subtracting the absolute pixel values of the image taken prior in time from the absolute pixel values of the reference image; and
   creating a difference image by subtracting the absolute pixel values of the image taken after the reference image from the absolute pixel values of the reference image.

6. The method of claim 1 wherein the moving target is located between a front wall or barrier and a back wall or barrier, and wherein the front wall and back wall or barrier produce radar signatures on the images of the region of interest which are effectively eliminated from the difference images.

7. The method of claim 1 further comprising interpreting the resulting set of combined difference images which contain the moving target signature by visually inspecting a sequence of difference images.

8. The method of claim 1 further comprising interpreting the resulting set of combined difference images by utilizing a constant false alarm rate (CFAR) algorithm, morphological processing, a cluster prediction algorithm, a clustering algorithm and a tracking algorithm.

9. The method of claim 8 wherein the cluster predication algorithm comprises a knee point algorithm and the clustering algorithm comprises a k-Means clustering algorithm.

10. A system for determining the presence of a moving target behind a wall or barrier based upon a time progression images of the region of interest using ultra-wideband radar at low frequencies; the system comprising at least one transmitter;
   at least one receiver receiving reflection from the region of interest; at least one processor and at least one memory operatively connected thereto; the at least one memory adapted to store a plurality of images of the region of interest that may contain a moving target signature taken at different points in time; the at least one processor configured to sequentially designate one of the plurality of ultra-wideband radar images as a reference frame, subtract the absolute pixel values of a predetermined number of images from the absolute pixel values of the reference frame to form difference images, eliminate the negative pixel values, minimize the side lobes, and form a combined difference image for each reference frame,
   whereby the system forms a series of combined difference images which contain the moving target signature.

11. The system of claim 10 wherein prior to minimizing the side lobes, the at least one processor averages the resulting difference images for each reference frame.

12. The system of claim 10 wherein the images are ultra-wideband radar images and wherein the series of combined difference images show the progression of the moving target over time as it moves behind the wall or barrier.

13. The system of claim 10 wherein the at least one processor forms first and second difference images by subtracting the absolute pixel values of an image taken prior to the reference frame from the absolute pixel values of the reference frame and the absolute pixel values of an image taken after the reference frame from the absolute pixel values of the reference frame.

14. The system of claim 10 wherein the moving target is located between a front wall or barrier and a back wall or barrier, and wherein the front wall and back wall or barrier produce radar signatures on the images of the region of interest which are effectively eliminated from the difference images.

15. The system of claim 10 wherein the system further processes the combined difference images by utilizing a constant false alarm rate (CFAR) algorithm, morphological processing, a cluster prediction algorithm, a clustering algorithm and a tracking algorithm to determine the presence of a moving target signature.

16. The system of claim 10 wherein the processor is configured to minimize the side lobes using a minimization technique comprising comparing pixel values at corresponding locations for a pair of difference images and selecting the minimum pixel value for each location to form a minimized image.

17. A ultra-wideband radar system for determining the presence of a moving target behind a wall or barrier based upon a time progression images of the region of interest using ultra-wideband radar at low frequencies; the ultra-wideband radar system comprising at least one transmitter; at least one receiver receiving reflection from the region of interest; at least one processor and at least one memory operatively connected thereto; the at least one memory adapted to store a plurality of images of the region of interest that may contain a moving target signature taken at different points in time; the at least one processor being configured to select a predetermined one of the plurality of images as a reference frame and compare others of the plurality of the images to form a first set of difference images, the at least one processor configured to eliminate the negative pixel values of the difference images, minimize the side lobes, and form combined difference images for the reference frame.

18. The system of claim 17 wherein the system is a synchronous impulse reconstruction radar system comprising an antenna array and wherein the at least one processor is configured to sequentially select a reference frame from the plurality of images and repeat the comparisons to others of the plurality of images to form difference images, eliminate negative pixel values of the difference images, minimize the side lobes, and combine difference images until the desired number of sets of combined images are formed.

19. The system of claim 17 wherein at least one processor compares the reference frame to other of the plurality of the images by subtracting the absolute pixel values of the frame to which the reference frame is being compared from the absolute pixel values of the reference frame to form a difference image.

20. The system of claim 17 wherein the at least one processor is configured to minimize the side lobes using a minimization technique comprising comparing pixel values at corresponding locations for a pair of difference images and selecting the minimum pixel value for each location to form a minimized image.

* * * * *